United States Patent
Ali et al.

(10) Patent No.: US 11,775,193 B2
(45) Date of Patent: Oct. 3, 2023

(54) SYSTEM AND METHOD FOR INDIRECT DATA CLASSIFICATION IN A STORAGE SYSTEM OPERATIONS

(71) Applicant: Dell Products L.P., Hopkinton, MA (US)

(72) Inventors: Rizwan Ali, Cedar Park, TX (US); Dharmesh M. Patel, Round Rock, TX (US); Ravikanth Chaganti, Bangalore (IN)

(73) Assignee: DELL PRODUCTS L.P., Hopkinton, MA (US)

( * ) Notice: Subject to any disclaimer, the term of this patent is extended or adjusted under 35 U.S.C. 154(b) by 642 days.

(21) Appl. No.: 16/528,620

(22) Filed: Aug. 1, 2019

(65) Prior Publication Data

US 2021/0034264 A1    Feb. 4, 2021

(51) Int. Cl.
*G06F 3/06*      (2006.01)
*G06F 18/24*     (2023.01)

(52) U.S. Cl.
CPC .......... *G06F 3/0641* (2013.01); *G06F 3/0604* (2013.01); *G06F 3/0683* (2013.01); *G06F 18/24* (2023.01)

(58) Field of Classification Search
CPC .... G06F 3/0641; G06F 3/0604; G06F 3/0683; G06K 9/6267
USPC ...................................................... 707/692
See application file for complete search history.

(56) References Cited

U.S. PATENT DOCUMENTS

| | | |
|---|---|---|
| 4,780,809 A | 10/1988 | Woffinden |
| 5,689,678 A | 11/1997 | Stallmo et al. |
| 6,098,098 A | 8/2000 | Sandahl et al. |
| 6,223,252 B1 | 4/2001 | Bandera et al. |
| 6,516,425 B1 | 2/2003 | Belhadj et al. |
| 7,636,814 B1 | 12/2009 | Karr |

(Continued)

FOREIGN PATENT DOCUMENTS

WO    2015114643 A1    8/2015

OTHER PUBLICATIONS

Extended European Search Report issued in corresponding European Application No. 20152195.2, dated Jun. 2, 2020.

(Continued)

*Primary Examiner* — Hosain T Alam
*Assistant Examiner* — Nicholas E Allen
(74) *Attorney, Agent, or Firm* — Chamberlain, Hrdlicka, White, Williams, & Aughtry

(57) ABSTRACT

A method for managing data includes obtaining data from a host, wherein the data is associated with an object identifier (ID), initiating a classification mapping update to obtain a classification entry, applying an erasure coding procedure to the data to obtain a plurality of data chunks and at least one parity chunk, deduplicating the plurality of data chunks to obtain a plurality of deduplicated data chunks, generating storage metadata associated with the plurality of deduplicated data chunks and the at least one parity chunk, generating an object entry associated with the plurality of data chunks, and the at least one parity chunk, wherein the object entry comprises the object ID and a classification ID, storing the storage metadata and the object entry in an accelerator pool, and storing the plurality of deduplicated data chunks and the at least one parity chunk.

15 Claims, 13 Drawing Sheets

(56) References Cited

U.S. PATENT DOCUMENTS

| | | |
|---|---|---|
| 7,882,386 B1 | 2/2011 | Potnis et al. |
| 7,987,353 B2 | 7/2011 | Holdaway et al. |
| 8,037,345 B1 | 10/2011 | Iyer et al. |
| 8,099,571 B1 | 1/2012 | Driscoll et al. |
| 8,161,255 B2 | 4/2012 | Anglin et al. |
| 8,190,835 B1 | 5/2012 | Yueh |
| 8,364,917 B2 | 1/2013 | Bricker et al. |
| 8,386,930 B2 | 2/2013 | Dillenberger et al. |
| 8,583,769 B1 | 11/2013 | Peters et al. |
| 8,788,466 B2 | 7/2014 | Anglin |
| 8,868,987 B2 | 10/2014 | Wagner |
| 8,874,892 B1 | 10/2014 | Chan et al. |
| 8,898,114 B1 | 11/2014 | Feathergill et al. |
| 8,949,208 B1 | 2/2015 | Xu et al. |
| 9,122,501 B1 | 9/2015 | Hsu et al. |
| 9,201,751 B1 | 12/2015 | Muthirisavenugopal et al. |
| 9,256,381 B1 | 2/2016 | Fultz et al. |
| 9,278,481 B2 | 3/2016 | Hull |
| 9,355,036 B2 | 5/2016 | Beard et al. |
| 9,521,198 B1 | 12/2016 | Agarwala et al. |
| 9,710,367 B1 | 7/2017 | Nagineni |
| 9,749,480 B1 | 8/2017 | Katano |
| 9,830,111 B1 | 11/2017 | Patiejunas et al. |
| 9,898,224 B1 | 2/2018 | Marshak et al. |
| 10,002,048 B2 | 6/2018 | Chennamsetty et al. |
| 10,013,323 B1 | 7/2018 | Puhov et al. |
| 10,013,325 B1 | 7/2018 | Garrett, Jr. et al. |
| 10,031,672 B2 | 7/2018 | Wang et al. |
| 10,057,184 B1 | 8/2018 | Prahlad et al. |
| 10,091,295 B1 | 10/2018 | Savic et al. |
| 10,097,620 B2 | 10/2018 | Reddy et al. |
| 10,152,254 B1 | 12/2018 | Kang et al. |
| 10,185,624 B2 | 1/2019 | Akutsu |
| 10,241,695 B2 | 3/2019 | Baptist |
| 10,339,455 B1 | 7/2019 | Parush-Tzur et al. |
| 10,409,778 B1 | 9/2019 | Zhao et al. |
| 10,452,301 B1 | 10/2019 | Farhan |
| 10,503,413 B1 | 12/2019 | Gal et al. |
| 10,503,611 B1 | 12/2019 | Srivastav |
| 10,528,429 B1 | 1/2020 | Vempati et al. |
| 10,817,392 B1 | 10/2020 | Mcauliffe et al. |
| 10,929,256 B2 | 2/2021 | Danilov et al. |
| 10,956,601 B2 | 3/2021 | Surla et al. |
| 10,963,345 B2 | 3/2021 | Patel et al. |
| 10,990,480 B1 | 4/2021 | Bernat et al. |
| 11,005,468 B1 | 5/2021 | Subramanian et al. |
| 11,112,990 B1 | 9/2021 | Bernat et al. |
| 2001/0044879 A1 | 11/2001 | Moulton |
| 2003/0036882 A1 | 2/2003 | Harper et al. |
| 2003/0058277 A1 | 3/2003 | Bowman-Amuah |
| 2003/0065873 A1 | 4/2003 | Collins et al. |
| 2003/0172145 A1 | 9/2003 | Nguyen |
| 2003/0177205 A1 | 9/2003 | Liang et al. |
| 2004/0128587 A1 | 7/2004 | Kenchammana-hosekote |
| 2004/0153844 A1 | 8/2004 | Ghose et al. |
| 2004/0260967 A1 | 12/2004 | Guha et al. |
| 2005/0076049 A1 | 4/2005 | Qubti et al. |
| 2005/0086557 A1 | 4/2005 | Sato et al. |
| 2005/0182797 A1 | 8/2005 | Adkins et al. |
| 2005/0262385 A1 | 11/2005 | Mcneill et al. |
| 2005/0283655 A1 | 12/2005 | Ashmore |
| 2007/0214255 A1 | 9/2007 | Spitz et al. |
| 2007/0283011 A1 | 12/2007 | Rakowski et al. |
| 2008/0244204 A1 | 10/2008 | Cremelie et al. |
| 2008/0282105 A1 | 11/2008 | Deenadhayalan et al. |
| 2009/0077165 A1 | 3/2009 | Rhodes et al. |
| 2009/0094250 A1 | 4/2009 | Dhuse |
| 2009/0235022 A1 | 9/2009 | Bates et al. |
| 2009/0254572 A1 | 10/2009 | Redlich et al. |
| 2009/0265360 A1 | 10/2009 | Bachwani |
| 2010/0061207 A1 | 3/2010 | Trantham |
| 2010/0138604 A1 | 6/2010 | Noguchi et al. |
| 2010/0241616 A1* | 9/2010 | Murphy ............... G06F 11/004 707/661 |
| 2011/0099351 A1 | 4/2011 | Condict |
| 2011/0173484 A1 | 7/2011 | Schuette et al. |
| 2011/0197024 A1 | 8/2011 | Thomas |
| 2011/0246597 A1 | 10/2011 | Swanson et al. |
| 2011/0302446 A1 | 12/2011 | Becker-szendy et al. |
| 2012/0096309 A1 | 4/2012 | Kumar et al. |
| 2013/0036277 A1 | 2/2013 | Szczepkowski et al. |
| 2013/0047029 A1 | 2/2013 | Ikeuchi et al. |
| 2013/0067459 A1 | 3/2013 | Sannidhanam et al. |
| 2013/0086006 A1 | 4/2013 | Colgrove |
| 2013/0151683 A1 | 6/2013 | Jain et al. |
| 2013/0339818 A1 | 12/2013 | Baker et al. |
| 2014/0020083 A1 | 1/2014 | Fetik |
| 2014/0032834 A1 | 1/2014 | Cudak et al. |
| 2014/0059311 A1 | 2/2014 | Oberhofer et al. |
| 2014/0089265 A1 | 3/2014 | Talagala et al. |
| 2014/0089630 A1 | 3/2014 | Pignatelli |
| 2014/0282824 A1 | 9/2014 | Lango et al. |
| 2014/0285917 A1 | 9/2014 | Cudak et al. |
| 2014/0297603 A1 | 10/2014 | Kim et al. |
| 2015/0012775 A1 | 1/2015 | Cudak et al. |
| 2015/0046756 A1 | 2/2015 | Sreekumaran et al. |
| 2015/0058582 A1 | 2/2015 | Baldwin et al. |
| 2015/0095596 A1 | 4/2015 | Yang |
| 2015/0161000 A1 | 6/2015 | Kim et al. |
| 2015/0205657 A1 | 7/2015 | Clark |
| 2015/0205669 A1 | 7/2015 | Sundaram et al. |
| 2015/0220400 A1 | 8/2015 | Resch |
| 2015/0227602 A1 | 8/2015 | Ramu et al. |
| 2015/0286545 A1 | 10/2015 | Brown |
| 2015/0355980 A1 | 12/2015 | Volvovski |
| 2015/0379430 A1 | 12/2015 | Dirac et al. |
| 2016/0013988 A1 | 1/2016 | Andrews |
| 2016/0057226 A1* | 2/2016 | Bestler ............... H04L 67/1095 709/217 |
| 2016/0062674 A1 | 3/2016 | Benight et al. |
| 2016/0070652 A1 | 3/2016 | Sundararaman et al. |
| 2016/0077933 A1 | 3/2016 | Ventura et al. |
| 2016/0085630 A1 | 3/2016 | Gardner |
| 2016/0170871 A1* | 6/2016 | Hyun ............... G06F 3/06 711/103 |
| 2016/0196324 A1* | 7/2016 | Haviv ............... G06F 3/0685 707/649 |
| 2016/0246537 A1 | 8/2016 | Kim |
| 2016/0313916 A1* | 10/2016 | Sivananainthaperumal ............... G06F 3/0685 |
| 2016/0334998 A1 | 11/2016 | George et al. |
| 2017/0031761 A1 | 2/2017 | Horan et al. |
| 2017/0090767 A1 | 3/2017 | Poston et al. |
| 2017/0099187 A1 | 4/2017 | Dale et al. |
| 2017/0147437 A1 | 5/2017 | Borlick et al. |
| 2017/0160983 A1 | 6/2017 | Fiske et al. |
| 2017/0192865 A1 | 7/2017 | Pan |
| 2017/0192868 A1 | 7/2017 | Vijayan et al. |
| 2017/0199893 A1 | 7/2017 | Aronovich et al. |
| 2017/0201545 A1 | 7/2017 | Nicodemus et al. |
| 2017/0206034 A1 | 7/2017 | Fetik |
| 2017/0235609 A1 | 8/2017 | Wires et al. |
| 2017/0262185 A1* | 9/2017 | Long ............... G06F 3/0631 |
| 2017/0272209 A1 | 9/2017 | Yanovsky et al. |
| 2017/0308436 A1 | 10/2017 | Agombar et al. |
| 2017/0308536 A1 | 10/2017 | Azzam et al. |
| 2018/0018227 A1 | 1/2018 | Kazi |
| 2018/0018235 A1 | 1/2018 | Arslan |
| 2018/0060894 A1 | 3/2018 | Beveridge et al. |
| 2018/0101305 A1 | 4/2018 | Kazi et al. |
| 2018/0157532 A1 | 6/2018 | Kumar et al. |
| 2018/0165169 A1 | 6/2018 | Camp et al. |
| 2018/0173730 A1* | 6/2018 | Copenhaver ............ G06F 16/212 |
| 2018/0189109 A1 | 7/2018 | Nagai et al. |
| 2018/0205785 A1 | 7/2018 | Caulfield et al. |
| 2018/0217898 A1 | 8/2018 | Tormasov |
| 2018/0260123 A1 | 9/2018 | Andresen et al. |
| 2018/0278597 A1 | 9/2018 | Helms et al. |
| 2018/0284987 A1 | 10/2018 | Lazier |
| 2018/0307560 A1 | 10/2018 | Vishnumolakala et al. |
| 2018/0314607 A1 | 11/2018 | Deshpande et al. |
| 2018/0322558 A1 | 11/2018 | Padmanabh et al. |
| 2018/0356998 A1 | 12/2018 | Wu et al. |
| 2019/0050263 A1 | 2/2019 | Patel et al. |

(56) References Cited

U.S. PATENT DOCUMENTS

| | | |
|---|---|---|
| 2019/0104398 A1 | 4/2019 | Owen et al. |
| 2019/0108099 A1 | 4/2019 | Mazumdar |
| 2019/0109772 A1 | 4/2019 | Lipstone et al. |
| 2019/0188079 A1 | 6/2019 | Kohli |
| 2019/0197023 A1 | 6/2019 | Chennamsetty et al. |
| 2019/0332473 A1 | 10/2019 | Yang et al. |
| 2019/0332502 A1 | 10/2019 | Ma et al. |
| 2019/0361850 A1 | 11/2019 | Uno et al. |
| 2019/0379588 A1 | 12/2019 | Rao |
| 2020/0026439 A1 | 1/2020 | Gao et al. |
| 2020/0034257 A1 | 1/2020 | Mahmood et al. |
| 2020/0042388 A1 | 2/2020 | Roberts |
| 2020/0050689 A1 | 2/2020 | Tal et al. |
| 2020/0065191 A1 | 2/2020 | Zhou |
| 2020/0133503 A1 | 4/2020 | Sun et al. |
| 2020/0175038 A1 | 6/2020 | Guan et al. |
| 2020/0201837 A1 | 6/2020 | Motwani et al. |
| 2020/0257457 A1 | 8/2020 | Matsugami et al. |

OTHER PUBLICATIONS

Suzhen Wu et al.; "Improving Reliability of Deduplication-based Storage Systems with Per-File Parity"; 2018 IEEE 37th International Symposium on Reliable Distributed Systems (SRDS); Salvador, Brazil; 2018; pp. 171-180 (DOI:10.1109/SRDS.2018.00028).

"Features—RoboHead"; Project Management Software for Marketing & Creative Teams, Aquent; 2018 (https://www.robohead.net/features).

"Make more time for the work that matters most"; Asana, Inc.; 2017 (https://asana.com/).

"Online Project Management Tools & Features"; ProWorkflow; Jun. 2015 (https://www.proworkflow.com/features-project-management-tools/).

* cited by examiner

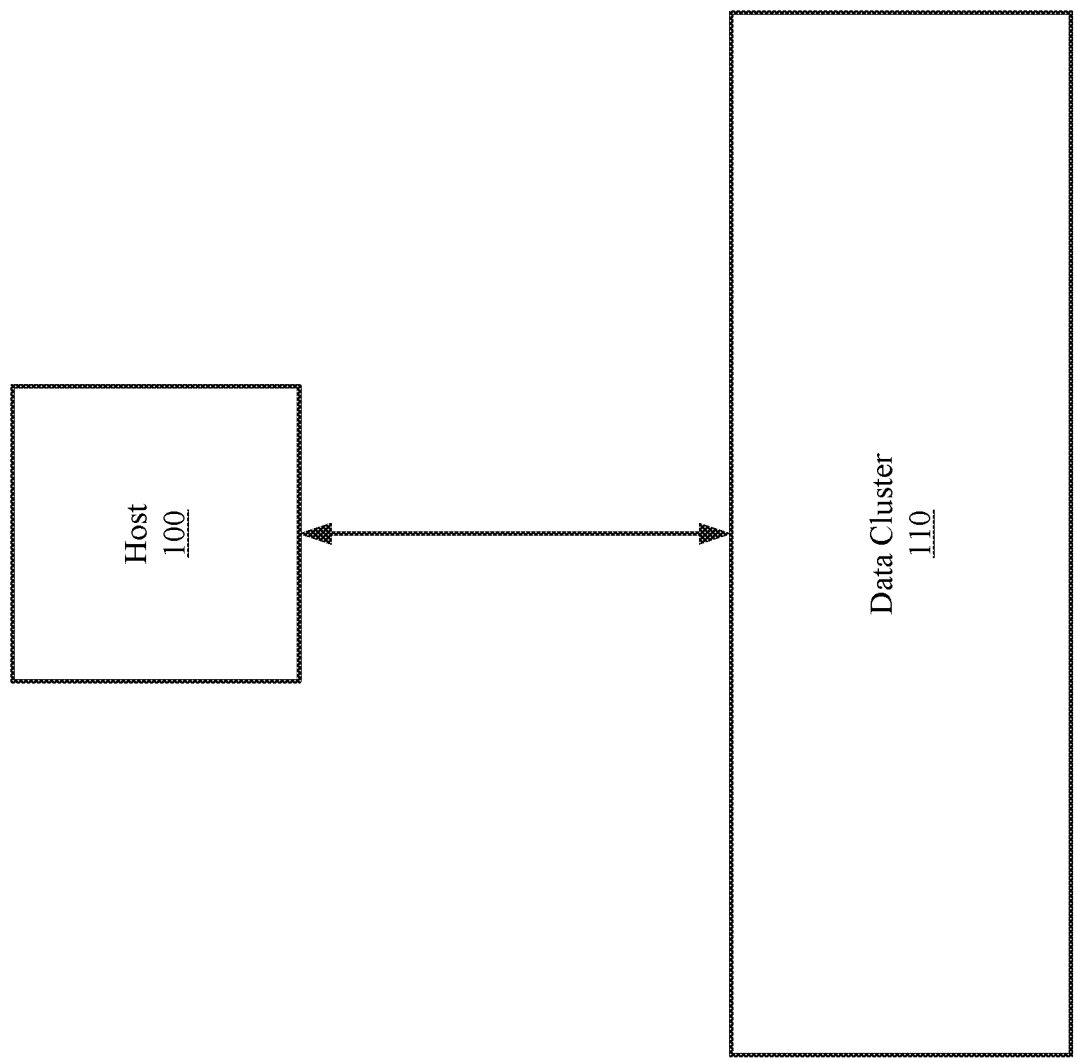

US 11,775,193 B2

SYSTEM AND METHOD FOR INDIRECT DATA CLASSIFICATION IN A STORAGE SYSTEM OPERATIONS

BACKGROUND

Computing devices may include any number of internal components such as processors, memory, and persistent storage. Each of the internal components of a computing device may be used to generate data. Given the large volume of data that is generated, a significant number of resources may be required to manage the generated data.

SUMMARY

In general, in one aspect, the invention relates to a method for managing data. The method includes obtaining data from a host, wherein the data is associated with an object identifier (ID), initiating a classification mapping update to obtain a classification entry, wherein the classification entry is associated with a classification ID, applying an erasure coding procedure to the data to obtain a plurality of data chunks and at least one parity chunk, deduplicating the plurality of data chunks to obtain a plurality of deduplicated data chunks, generating storage metadata associated with the plurality of deduplicated data chunks and the at least one parity chunk, generating an object entry associated with the plurality of data chunks, and the at least one parity chunk, wherein the object entry comprises the object ID and the classification ID, storing the storage metadata and the object entry in an accelerator pool, and storing, across a plurality of fault domains, the plurality of deduplicated data chunks and the at least one parity chunk.

In general, in one aspect, the invention relates to a non-transitory computer readable medium which includes computer readable program code, which when executed by a computer processor enables the computer processor to perform a method for managing data. The method includes obtaining data from a host, wherein the data is associated with an object identifier (ID), initiating a classification mapping update to obtain a classification entry, wherein the classification entry is associated with a classification ID, applying an erasure coding procedure to the data to obtain a plurality of data chunks and at least one parity chunk, deduplicating the plurality of data chunks to obtain a plurality of deduplicated data chunks, generating storage metadata associated with the plurality of deduplicated data chunks and the at least one parity chunk, generating an object entry associated with the plurality of data chunks, and the at least one parity chunk, wherein the object entry comprises the object ID and the classification ID, storing the storage metadata and the object entry in an accelerator pool, and storing, across a plurality of fault domains, the plurality of deduplicated data chunks and the at least one parity chunk.

In general, in one aspect, the invention relates to a data cluster that includes a host and an accelerator pool that includes a plurality of data nodes, wherein a data node of the plurality of data nodes includes a processor and memory that includes instructions, which when executed by the processor perform a method for managing data. The method includes obtaining data from a host, wherein the data is associated with an object identifier (ID), initiating a classification mapping update to obtain a classification entry, wherein the classification entry is associated with a classification ID, applying an erasure coding procedure to the data to obtain a plurality of data chunks and at least one parity chunk, deduplicating the plurality of data chunks to obtain a plurality of deduplicated data chunks, generating storage metadata associated with the plurality of deduplicated data chunks and the at least one parity chunk, generating an object entry associated with the plurality of data chunks, and the at least one parity chunk, wherein the object entry comprises the object ID and the classification ID, storing the storage metadata and the object entry in an accelerator pool, and storing, across a plurality of fault domains, the plurality of deduplicated data chunks and the at least one parity chunk.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1A shows a diagram of a system in accordance with one or more embodiments of the invention.

DETAILED DESCRIPTION

Figure 1B:
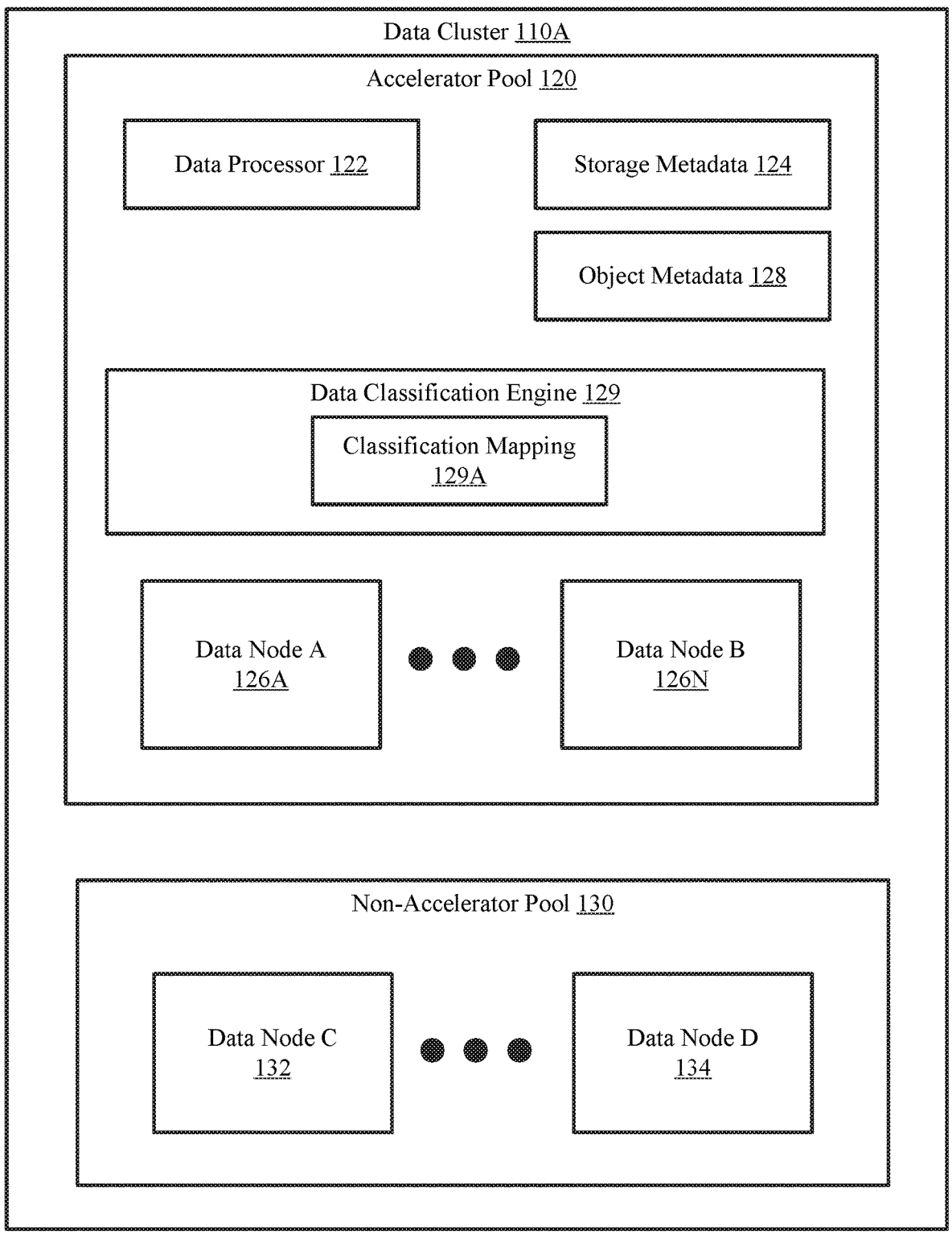
FIG. 1B shows a diagram of a data cluster in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to a method and system for storing data and metadata in a data cluster. Embodiments of the invention may utilize a data processor, operating in an accelerator pool, which applies an erasure coding procedure on data obtained from a host to divide the data into data chunks and to generate parity chunks using the data chunks. The data processor may then perform deduplication on the data chunks to generate deduplicated data that includes deduplicated data chunks. The deduplicated data chunks and the parity chunks are subsequently distributed to nodes in the data cluster in accordance with an erasure coding procedure.

In one or more embodiments of the invention, the accelerator pool stores storage metadata that specifies the nodes in which each data chunk and parity chunk is stored and object metadata that specifies an object associated with each data chunk. The storage metadata and object metadata may also be distributed to nodes in the non-accelerator pool. In this manner, if the storage metadata or object metadata stored in the accelerator pool becomes unavailable, the storage metadata and/or object metadata may be reconstructed using the storage metadata stored in the non-accelerator pool.

In one or more embodiments of the invention, a data classification engine of the accelerator pool obtains classification attributes about the object. The classification attributes may relate to a geolocation in which the data associated with the object was obtained, an organization or legal entity that owns the object, any policies or regulations associated with the object, and/or other classification attributes without departing from the invention. The attributes associated with the object may be stored in an entry of a classification mapping of the data classification engine. The entry may include a classification (ID) that may be stored in the object metadata. In this manner, embodiments of the invention enable the classification to be associated (or bound) to the object (or more specifically to the data chunks (described below) that make up the object). By binding the classification at a granular level, embodiments of the invention enable granular use and updating of the classification. Moreover, embodiments of the invention, bind the classification to the object (or portions thereof) without requiring the object's contents to be analyzed. In this manner, embodiments of the invention enable more efficient classification and limit the exposure of potentially sensitive data that is included within the objects.

FIG. 1A shows an example system in accordance with one or more embodiments of the invention. The system includes a host (100) and a data cluster (110). The host (100) is operably connected to the data cluster (110) via any combination of wired and/or wireless connections.

In one or more embodiments of the invention, the host (100) utilizes the data cluster (110) to store data. The data stored may be backups of databases, files, applications, and/or other types of data without departing from the invention.

Figure 5:
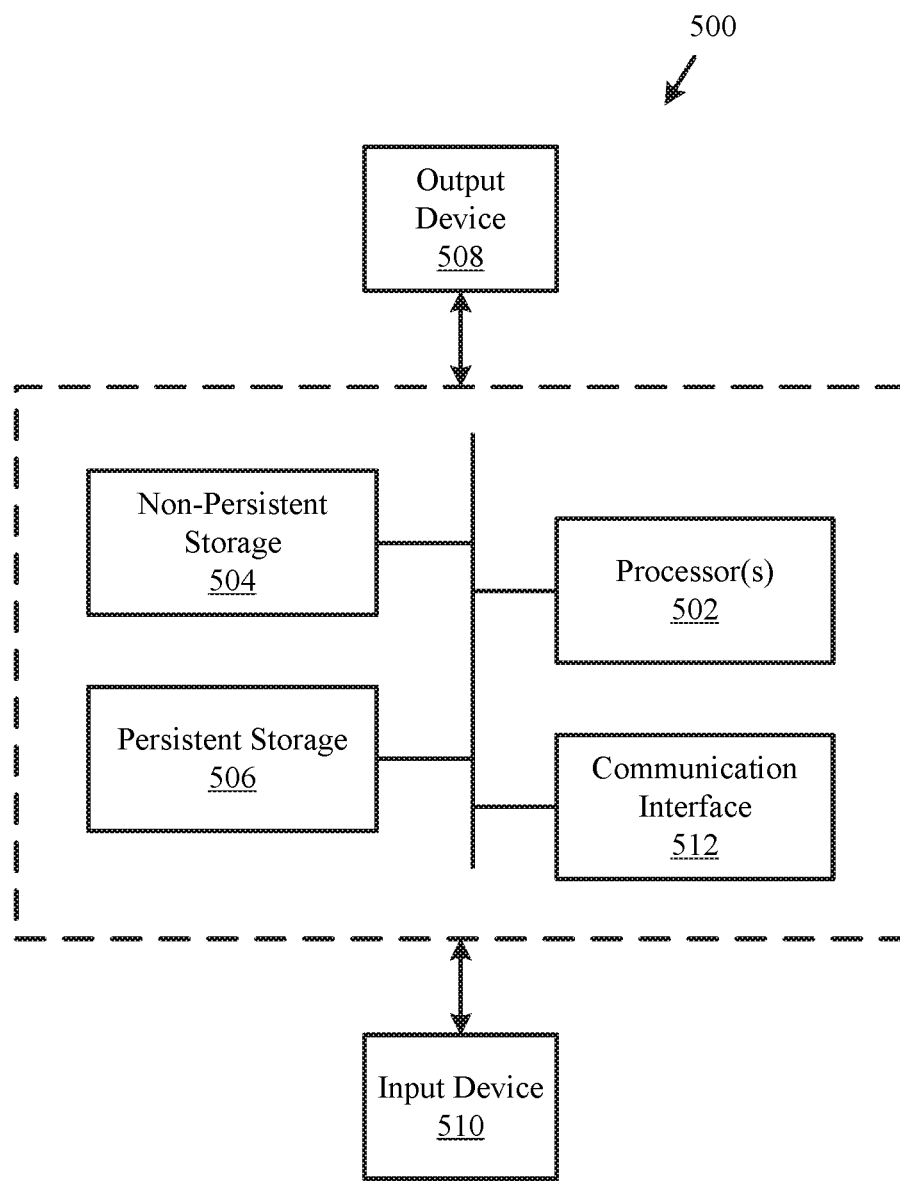
FIG. 5 shows a diagram of a computing device in accordance with one or more embodiments of the invention.

In one or more embodiments of the invention, the host (100) is implemented as a computing device (see e.g., FIG. 5). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the host (100) described throughout this application.

In one or more embodiments of the invention, the host (100) is implemented as a logical device. The logical device may utilize the computing resources of any number of computing devices and thereby provide the functionality of the host (100) described throughout this application.

In one or more embodiments of the invention, the data cluster (110) stores data, metadata, and/or backups of data generated by the host (100). The data and/or backups may be deduplicated versions of data obtained from the host. The data cluster may, via an erasure coding procedure, store portions of the data (which may or may not be deduplicated) across nodes operating in the data cluster (110).

As used herein, deduplication refers to methods of storing only portions (also referred to as file segments or segments) of files (which are a type of object) that are not already stored in persistent storage. For example, when multiple versions of a large file, having only minimal differences between each of the versions, are stored without deduplication, storing each version will require approximately the same amount of storage space of a persistent storage. In contrast, when the multiple versions of the large file are stored with deduplication, only the first version of the multiple versions stored will require a substantial amount of storage. Once the first version is stored in the persistent storage, the subsequent versions of the large file subsequently stored will be deduplicated before being stored in the persistent storage resulting in much less storage space of the persistent storage being required to store the subsequently stored versions when compared to the amount of storage space of the persistent storage required to store the first stored version.

Continuing with the discussion of FIG. 1A, the data cluster (110) may include nodes that each store any number of portions of data. The portions of data may be obtained by other nodes or obtained from the host (100). For additional details regarding the data cluster (110), see, e.g., FIG. 1B.

FIG. 1B shows a diagram of a data cluster (110A) in accordance with one or more embodiments of the invention. The data cluster (110A) may be an embodiment of the data cluster (110, FIG. 1A) discussed above. The data cluster (110A) may include an accelerator pool (120) and a non-accelerator pool (130). The accelerator pool (120) may include a data processor (122), a data classification engine (129), storage metadata (124), object metadata (128) and any number of data nodes (126A, 126N). Similarly, the non-accelerator pool (130) includes any number of data nodes (132, 134). The components of the data cluster (110A) may be operably connected via any combination of wired and/or wireless connections. Each of the aforementioned components is discussed below.

In one or more embodiments of the invention, the data processor (122) is a device that includes functionality to perform deduplication on data obtained from a host (e.g., 100, FIG. 1A). The data processor (122) may generate, utilize, and update storage metadata (124) (as described in FIG. 2A) as part of its deduplication functionality. In one or more embodiments of the invention, the storage metadata (124) is a data structure that stores unique identifiers of portions data stored in the data cluster (110A). The unique identifiers stored in the storage metadata (124) may be used to determine whether a data chunk of the obtained data is already present elsewhere in the accelerator pool (120) or the non-accelerator pool (130). The data processor (122) may use the storage information to perform the deduplication and generate deduplicated data. The data processor (122) may perform the deduplication and/or erasure coding procedure via the method illustrated in FIG. 3A.

In one or more embodiments of the invention, the storage metadata (124) is stored in a data node (126A, 126N) of the accelerator pool (120). A copy of the storage metadata (124) may be distributed to one or more data nodes (132, 134) of the non-accelerator pool (130). In this manner, if the storage metadata (124) stored in the accelerator pool (120) experiences a failure (e.g., it becomes unavailable, corrupted, etc.), the storage metadata (124) may be reconstructed using the copies of storage metadata stored in the non-accelerator pool (130). For additional detail regarding the distribution on storage metadata, see e.g., FIG. 3A.

In one or more embodiments of the invention, the data processor (122) updates object metadata (128) after storing data chunks (which may be deduplicated) and parity chunks. In one or more embodiments of the invention, the object metadata is a data structure, stored in a computing device (e.g., a data node (126A, 126N)) of the accelerator pool (120), includes object information about the data stored in the data cluster (110A). An object may be, for example, a file, a set of files, a portion of a file, a backup of any combination thereof, and/or any other type of data without departing from the invention. For additional details regarding the object metadata, see, e.g., FIG. 2B.

Figure 3A:
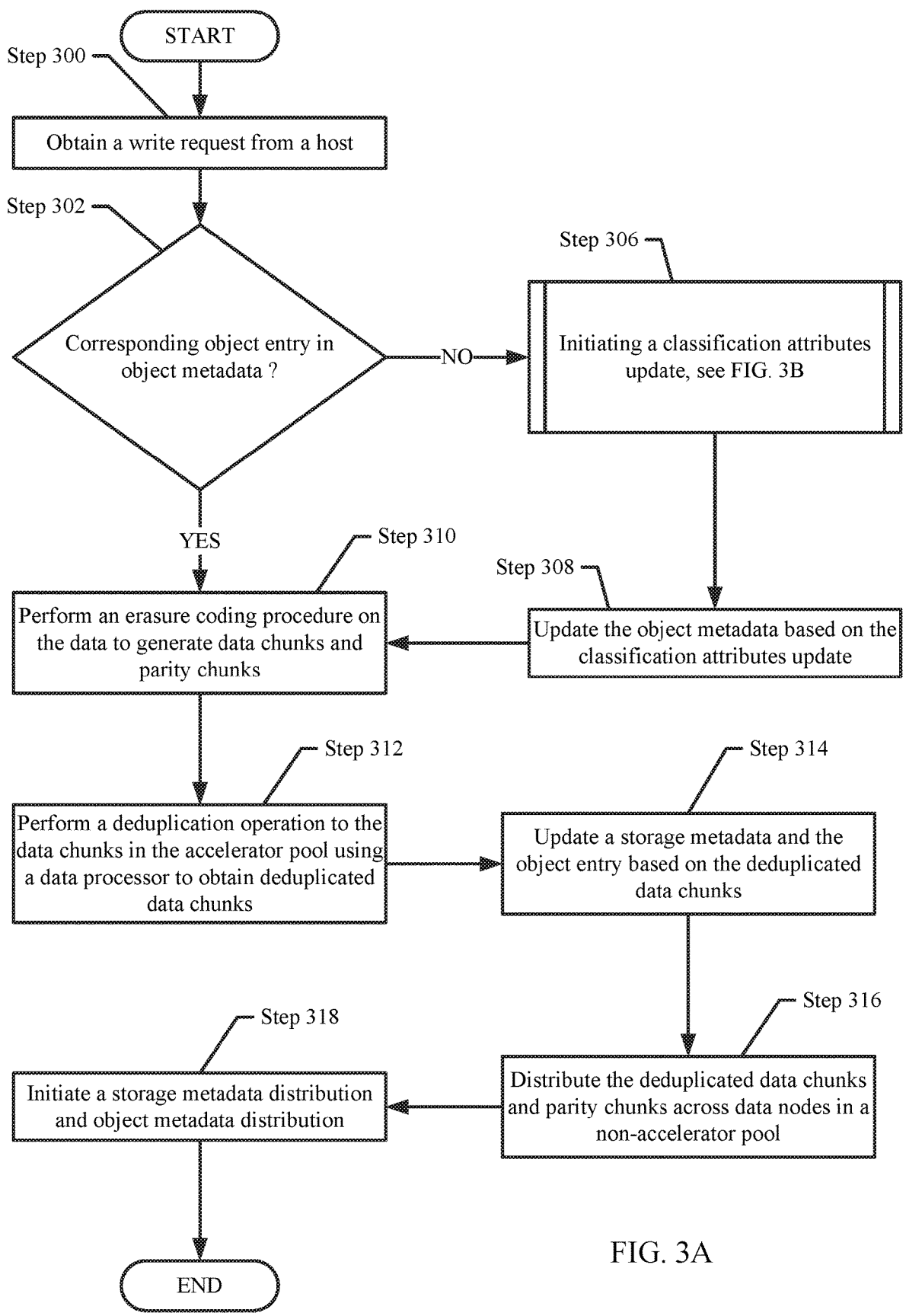
FIG. 3A shows a flowchart for storing data in a data cluster in accordance with one or more embodiments of the invention.

In one or more of embodiments of the invention, the data processor (122) is implemented as computer instructions, e.g., computer code, stored on a persistent storage that when executed by a processor of a data node (e.g., 126A, 126N) of the accelerator pool (120) cause the data node to provide the aforementioned functionality of the data processor (122) described throughout this application and/or all, or a portion thereof, of the method illustrated in FIG. 3A.

In one or more embodiments of the invention, the data processor (122) is implemented as a computing device (see e.g., FIG. 5). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the data processor (122) described throughout this application and/or all, or a portion thereof, of the method illustrated in FIG. 3A.

In one or more embodiments of the invention, the data processor (122) is implemented as a logical device. The logical device may utilize the computing resources of any number of computing devices and thereby provide the functionality of the data processor (122) described throughout this application and/or all, or a portion thereof, of the method illustrated in FIG. 3A.

In one or more embodiments of the invention, the data classification engine (129) manages the data classification of objects stored in the data cluster (110A). The data classification engine may manage the data classification based on classification information provided by the host it is attempting to store an object from and/or by obtaining data classification information from a host (e.g., 100, FIG. 1A) associated with an object and storing the data classification information. The data classification engine (129) may store the data classification information in a classification mapping (129A). In one or more embodiments of the invention, the classification mapping (129A) is a data structure that specifies classification attributes for objects of the object metadata (128). For additional details regarding the classification mapping (129A), see, e.g., FIG. 2C.

Figure 3B:
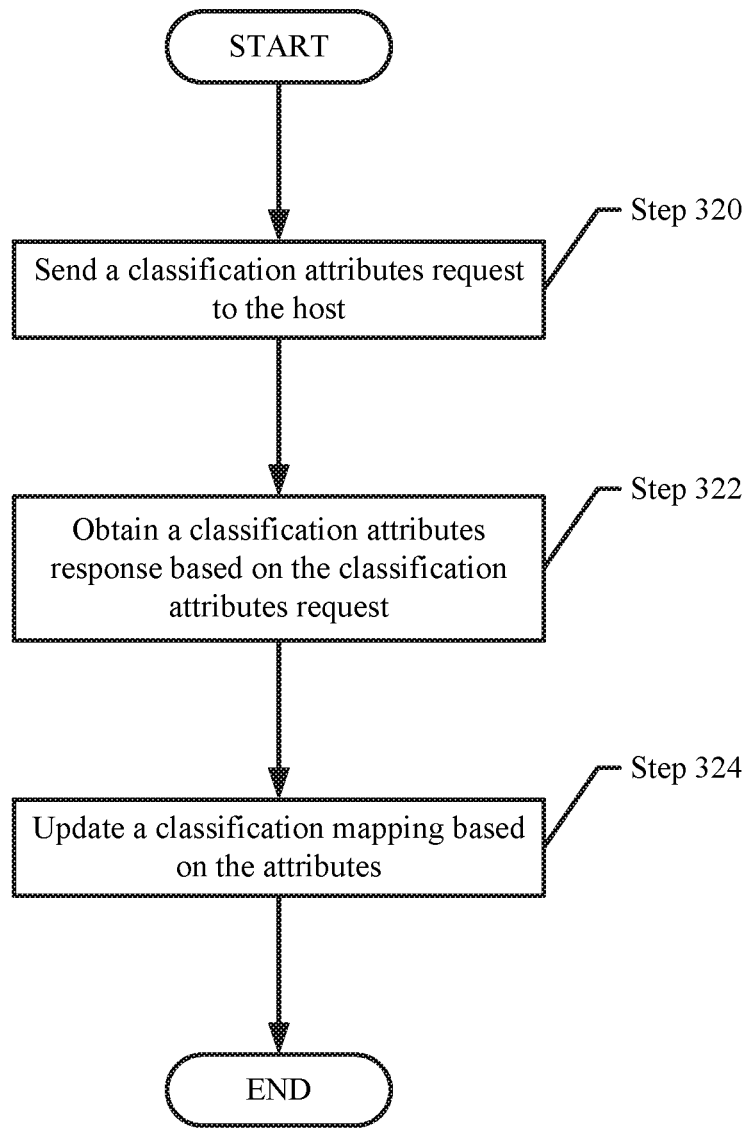
FIG. 3B shows a flowchart for initiating a classification attributes update in accordance with one or embodiments of the invention.
Figure 3C:
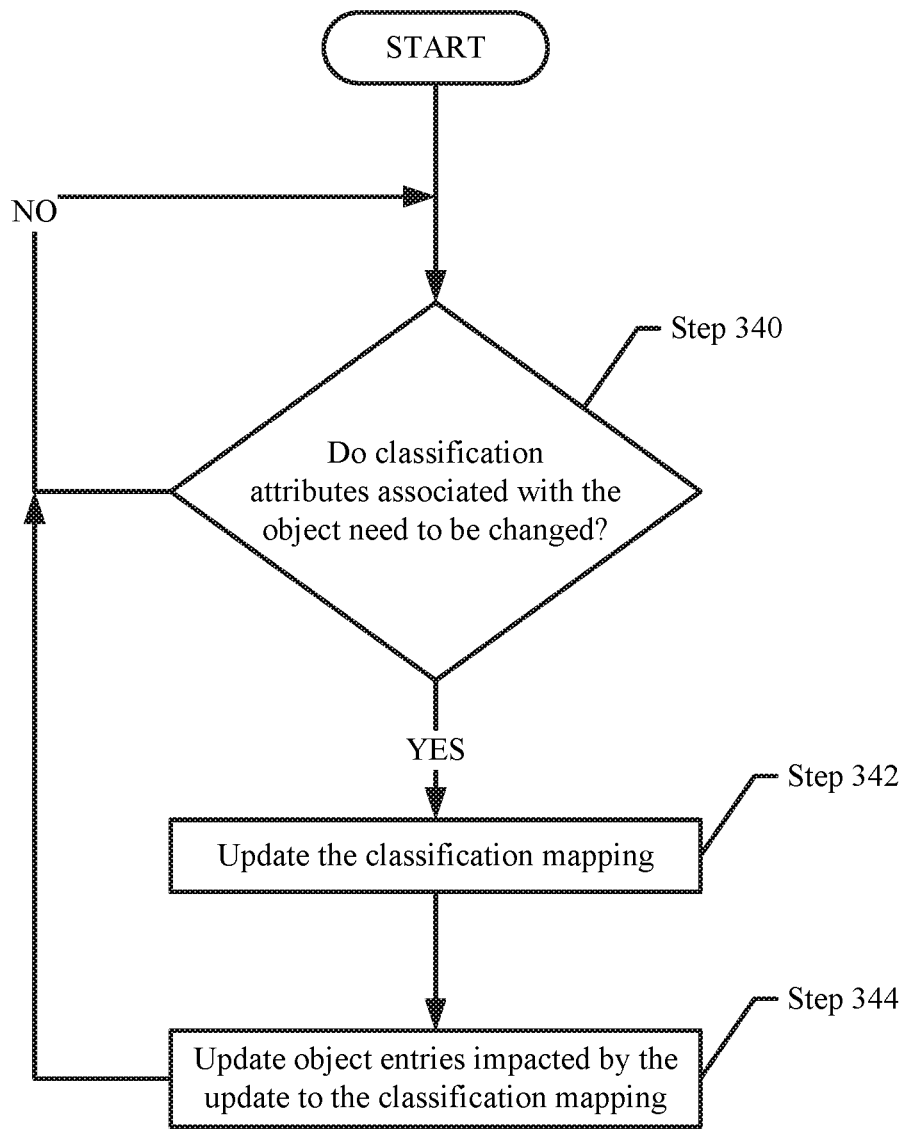
FIG. 3C shows a flowchart for updating a classification mapping in accordance with one or more embodiments of the invention.

In one or more of embodiments of the invention, the data classification engine (129) is implemented as computer instructions, e.g., computer code, stored on a persistent storage that when executed by a processor of a data node (e.g., 126A, 126N) of the accelerator pool (120) cause the data node to provide the aforementioned functionality of the data classification engine (129) described throughout this application and/or all, or a portion thereof, of the method illustrated in FIGS. 3A-3C.

In one or more embodiments of the invention, the data classification engine (129) is implemented as a computing device (see e.g., FIG. 5). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the data classification (129) described throughout this application and/or all, or a portion thereof, of the method illustrated in FIGS. 3A-3C.

In one or more embodiments of the invention, the data classification engine (129) is implemented as a logical device. The logical device may utilize the computing resources of any number of computing devices and thereby provide the functionality of the data classification engine (129) described throughout this application and/or all, or a portion thereof, of the method illustrated in FIGS. 3A-3C.

Continuing with the discussion of FIG. 1B, different data nodes in the cluster may include different quantities and/or types of computing resources, e.g., processors providing processing resources, memory providing memory resources, storages providing storage resources, communicators providing communications resources. Thus, the system may include a heterogeneous population of nodes.

The heterogeneous population of nodes may be logically divided into: (i) an accelerator pool (120) including nodes that have more computing resources, e.g., high performance nodes (126A, 126N), than other nodes and (ii) a non-accelerator pool (130) including nodes that have fewer computing resources, e.g., low performance nodes (132, 134) than the nodes in the accelerator pool (120). For example, nodes of the accelerator pool (120) may include enterprise-class solid state storage resources that provide very high storage bandwidth, low latency, and high input-outputs per second (IOPS). In contrast, the nodes of the non-accelerator pool (130) may include hard disk drives that provide lower storage performance. While illustrated in FIG. 1B as being divided into two groups, the nodes may be divided into any number of groupings based on the relative performance level of each node without departing from the invention.

In one or more embodiments of the invention, the data nodes (126A, 126N, 132, 134) store data chunks and parity chunks along with storage metadata (as described below). The data nodes (126A, 126N, 132, 134) may include persistent storage that may be used to store the data chunks, parity chunks and storage metadata. The generation of the data chunks and parity chunks as well as the storage metadata is described below with respect to FIG. 3A. For additional details regarding the data nodes (126A, 126N, 132, 134), see, e.g., FIG. 1C.

In one or more embodiments of the invention, the non-accelerator pool (130) includes any number of fault domains. In one or more embodiments of the invention, a fault domain is a logical grouping of nodes (e.g., data nodes) that, when one node of the logical grouping of nodes goes offline and/or otherwise becomes inaccessible, the other nodes in the same logical grouping of nodes are directly affected. However, nodes in a different fault domain may be unaffected. For additional details regarding fault domains, see, e.g. FIG. 1E.

In one or more embodiments of the invention, each data node (126A, 126N, 132, 134) is implemented as a computing device (see e.g., FIG. 5). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the data node (126A, 126N, 132, 134) described throughout this application and/or all, or a portion thereof, of the method illustrated in FIGS. 3A-3C.

In one or more embodiments of the invention, each of the data nodes (126A, 126N, 132, 134) is implemented as a logical device. The logical device may utilize the computing resources of any number of computing devices and thereby provide the functionality of the data nodes (126A, 126N, 132, 134) described throughout this application and/or all, or a portion thereof, of the method illustrated in FIGS. 3A-3C. For additional details regarding the data nodes (126A, 126N, 132, 134), see, e.g., FIG. 1C.

Figure 1C:
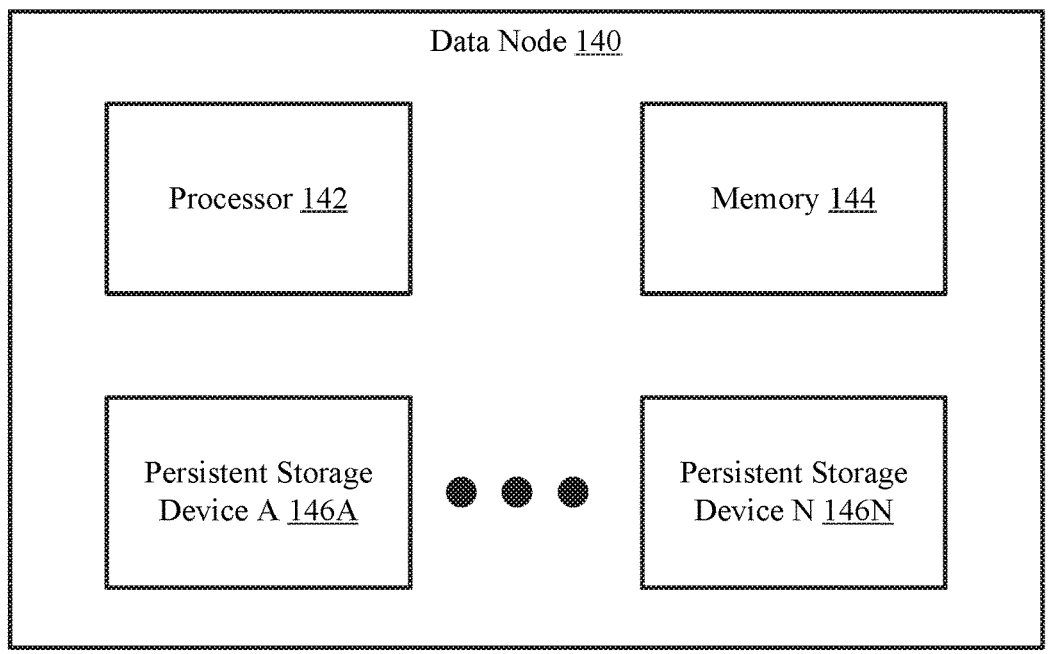
FIG. 1C shows a diagram of a data node in accordance with one or more embodiments of the invention.

FIG. 1C shows a diagram of a data node (140) in accordance with one or more embodiments of the invention. The data node (140) may be an embodiment of a data node (126A, 126N, 132, 134, FIG. 1B) discussed above. Each data node may be equipped with a processor (142), memory (144), and one or more persistent storage devices (146A, 146N). Each component of the data node (140) may be operatively connected to each other via wired and/or wireless connections. The data node (140) may have additional, fewer, and/or different components without departing from the invention. Each of the illustrated components of the data node (140) is discussed below.

In one or more embodiments of the invention, the processor (142) is a component that processes data and processes of requests. The processor (142) may be, for example, a central processing unit (CPU). The processor may process a request to rebuild data and/or metadata using data stored in memory (144) and/or the persistent storage devices (146A, 146N). The processor (142) may process other requests without departing from the invention.

In one or more embodiments of the invention, the data node includes memory (144) which stores data that is more accessible to the processor (142) than the persistent storage devices (146A, 146N). The memory (144) may be volatile storage. Volatile storage may be storage that stores data that is lost when the storage loses power. The memory may be, for example, Random Access Memory (RAM). In one or more embodiments of the invention, a copy of the storage metadata discussed in FIG. 1B and a copy of the object metadata discussed in FIG. 1B is stored in the memory (144) of the data node (140).

In one or more embodiments of the invention, the persistent storage devices (146A, 146N) store data. The data may be data chunks and/or parity chunks. In addition, the data may also include storage metadata. The persistent storage devices (146A, 146N) may be non-volatile storage. In other words, the data stored in the persistent storage devices (146A, 146N) is not lost or removed when the persistent storage devices (146A, 146N) lose power. Each of the persistent storage devices (146A, 146N) may be, for example, solid state drives, hard disk drives, and/or tape drives. The persistent storage devices may include other types of non-volatile or non-transitory storage mediums without departing from the invention. For additional details regarding the persistent storage devices, see, e.g., FIG. 1D.

Figure 1D:
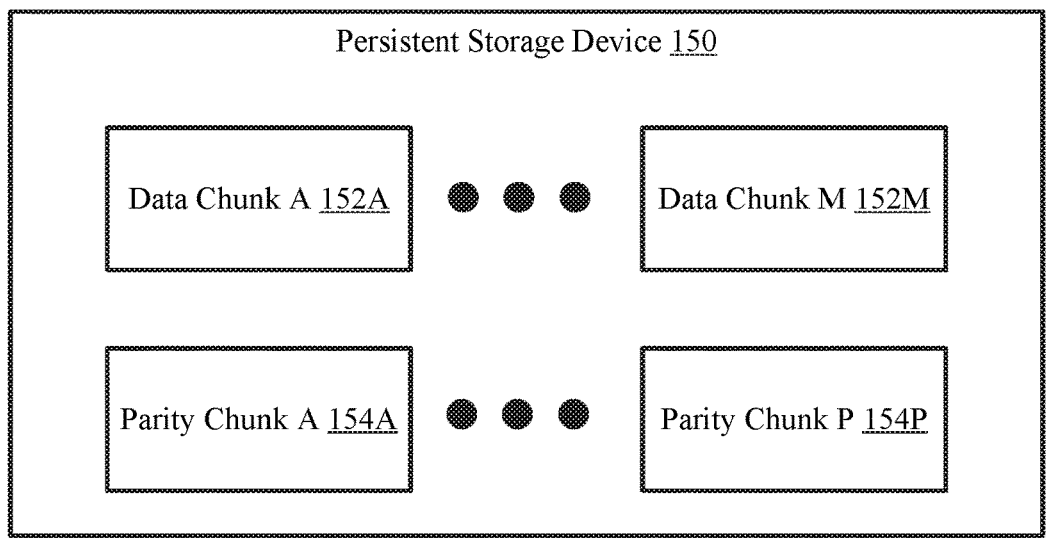
FIG. 1D shows a diagram of persistent storage in accordance with one or more embodiments of the invention.

FIG. 1D shows a diagram of a persistent storage device. The persistent storage device (150) may be an embodiment of a persistent storage device (146A, 146N) discussed above. As discussed above, the persistent storage device (150) stores data. The data may be data chunks (152A, 152M) and parity chunks (154A, 154P). Though not shown in FIG. 1D, the data may also include storage metadata and/or object metadata.

In one or more embodiments of the invention, a data chunk (152A, 152M) is a data structure that includes a portion of data that was obtained from a host. The data chunks (152A, 152M) may be deduplicated by a data processor and obtained by the data node (140) from the data processor. Each of the data chunks (152A, 152M) may be used by the data node (140) (or another data node) to reconstruct another data chunk or a parity chunk based on an erasure coding algorithm that was applied to the other data chunk or parity chunk.

In one or more embodiments of the invention, a parity chunk (154A, 154P) is a data structure that includes a parity value generated using an erasure coding algorithm. The parity value may be generated by applying the erasure coding algorithm to one or more data chunks stored in the data node (140) or other data nodes. Each of the parity chunks (154A, 154P) may be used by the data node (140) (or another data node) to reconstruct another parity chunk or a data chunk based on an erasure coding algorithm that was applied to the other parity chunk or data chunk.

Figure 1E:
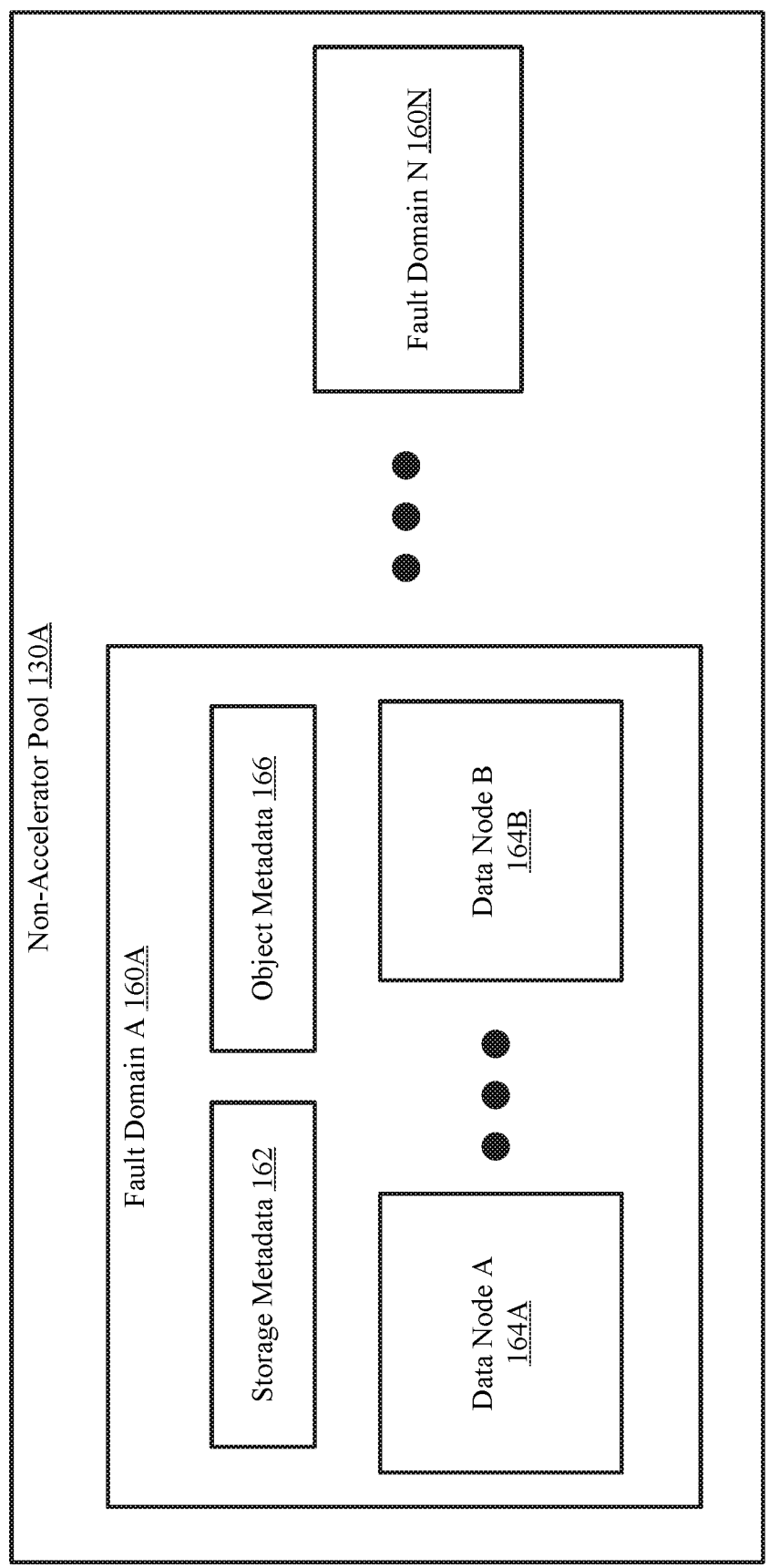
FIG. 1E shows a diagram of a non-accelerator pool in accordance with one or more embodiments of the invention.

FIG. 1E shows a diagram of a non-accelerator pool in accordance with one or more embodiments of the invention. The non-accelerator pool (130A) is an embodiment of the non-accelerator pool (130, FIG. 1B) discussed above. The non-accelerator pool (130A) may include any number of fault domains (160A, 160N).

As discussed above, a fault domain (160A, 160N) is a logical grouping of data nodes (164A, 164B) that, when one data node of the logical grouping of data nodes goes offline and/or otherwise becomes inaccessible, the other nodes in the logical grouping of nodes are directly affected. The effect of the node going offline to the other nodes may include the other nodes also going offline and/or otherwise inaccessible. The non-accelerator pool (130) may include multiple fault domains. In this manner, the events of one fault domain in the non-accelerator pool (130A) may have no effect to other fault domains in the non-accelerator pool (130A).

For example, two data nodes may be in a first fault domain (e.g., 160A). If one of these data nodes in the first fault domain (160A) experiences an unexpected shutdown, other nodes in the first fault domain may be affected. In contrast, another data node in a second fault domain may not be affected by the unexpected shutdown of a data node in the first fault domain. In one or more embodiments of the invention, the unexpected shutdown of one fault domain does not affect the nodes of other fault domains. In this manner, data may be replicated and stored across multiple fault domains to allow high availability of the data.

As discussed above, the data chunks and parity chunks of a slice (e.g., generated using the erasure coding described in FIG. 3A) may be stored in different fault domains (160A, 160N). Storing the data chunks and parity chunks in multiple fault domains may be for recovery purposes. In the event that one or more fault domains storing data chunks or parity chunks become inaccessible, the data chunks and/or parity chunks stored in the remaining fault domains may be used to recreate the inaccessible data. In one embodiment of the invention, as part of (or in addition to) the chunk metadata, the storage metadata (162) tracks the members of each slice (i.e., which data chunks and which parity chunks are part of a slice). This information may be used to aid in any recover operation that is required to be performed on the data stored in the data cluster.

In one or more embodiments of the invention, each fault domain (160A, 160N) stores a copy of storage metadata (162) and a copy of object metadata (166) obtained from an accelerator pool and/or from another fault domain (160A, 160N) distributing a copy of the storage metadata. The copy of storage metadata (162) and the copy of the object metadata (166) in a fault domain (e.g., 160A) may each be stored in one or more data nodes (164A, 164B) of the fault domain. Further, a copy of a classification mapping (e.g., 129A, FIG. 1B) stored in an accelerator pool may be stored in one or more data node (164A, 164B) of the fault domain (160A, 160N). The copy of storage metadata (162) and the copy of object metadata (166) may each be stored in any other computing device associated with the fault domain (160A) without departing from the invention.

Figure 2A:
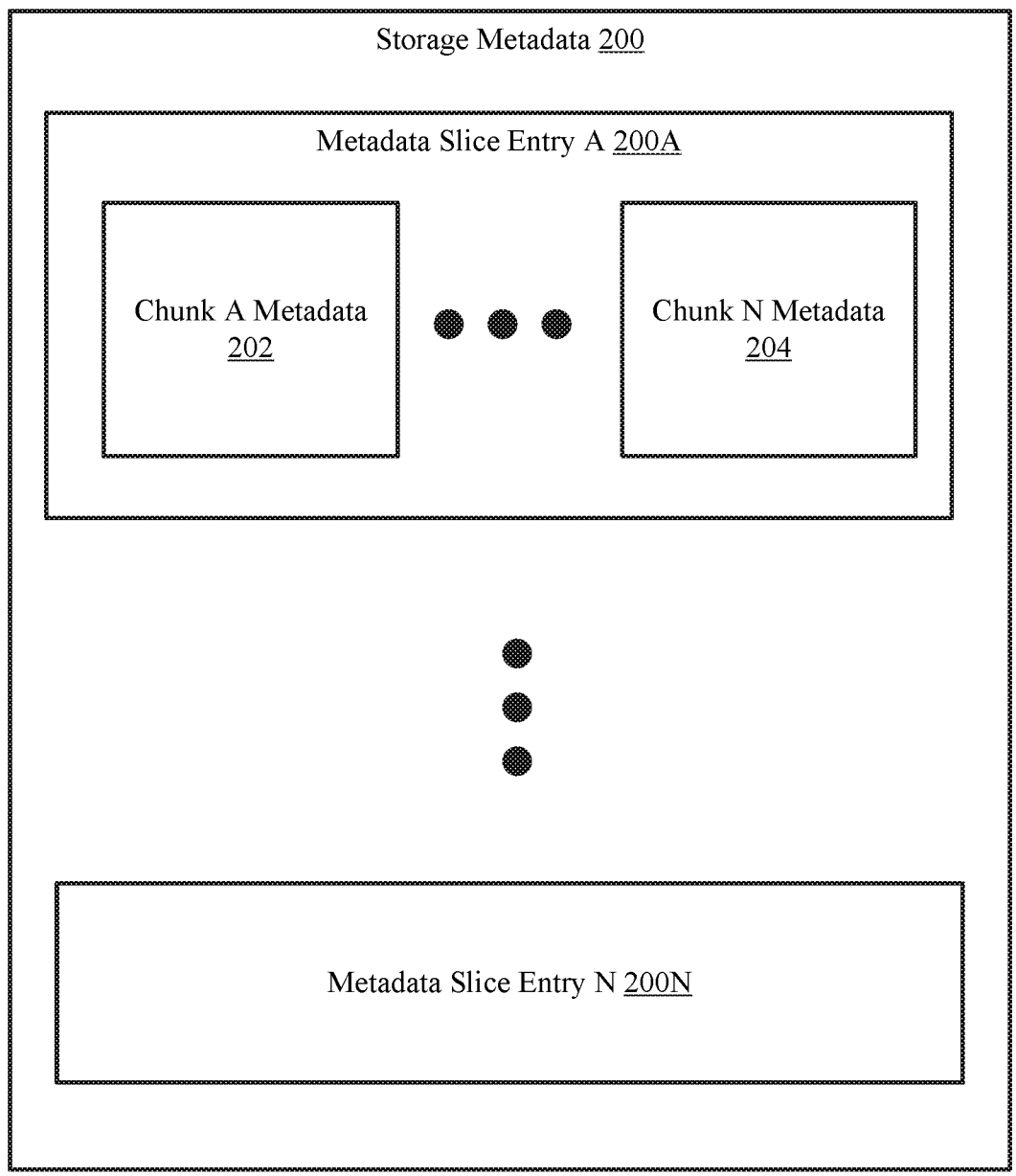
FIG. 2A shows a diagram of storage metadata in accordance with one or more embodiments of the invention.

FIG. 2A shows a diagram of storage metadata in accordance with one or more embodiments of the invention. The storage metadata (200) may be an embodiment of the storage metadata (124, FIG. 1B; 162, FIG. 1E) discussed above. As discussed above, the storage metadata (200) stores information about data chunks or parity chunks (collectively, chunks). The storage information may include one or more metadata slice entries (200A, 200N). Each metadata slice entry (200A, 200N) may include chunk metadata (202, 204). Each of the aforementioned portions of the storage metadata (200) is discussed below.

In one or more embodiments of the invention, a metadata slice entry (200A, 200N) is an entry that specifies metadata associated with chunks of data generated using an erasure coding procedure. The metadata slice entry (200A, 200N) includes chunk metadata (202, 204). Each chunk metadata (202, 204) may correspond to metadata for a data chunk or a parity chunk. Each chunk metadata (202, 204) may include information about a chunk such as, for example, a unique identifier (e.g., a fingerprint) and a storage location of the chunk, e.g., the non-accelerator pool. The unique identifier of a chunk may be generated using the chunk (e.g., calculated using the data of the chunk). The chunk metadata may also include a classification ID. In this scenario, the classification ID is the same classification ID associated with the object, where the chunk metadata corresponds to a chunk that is part of the object.

Figure 2B:
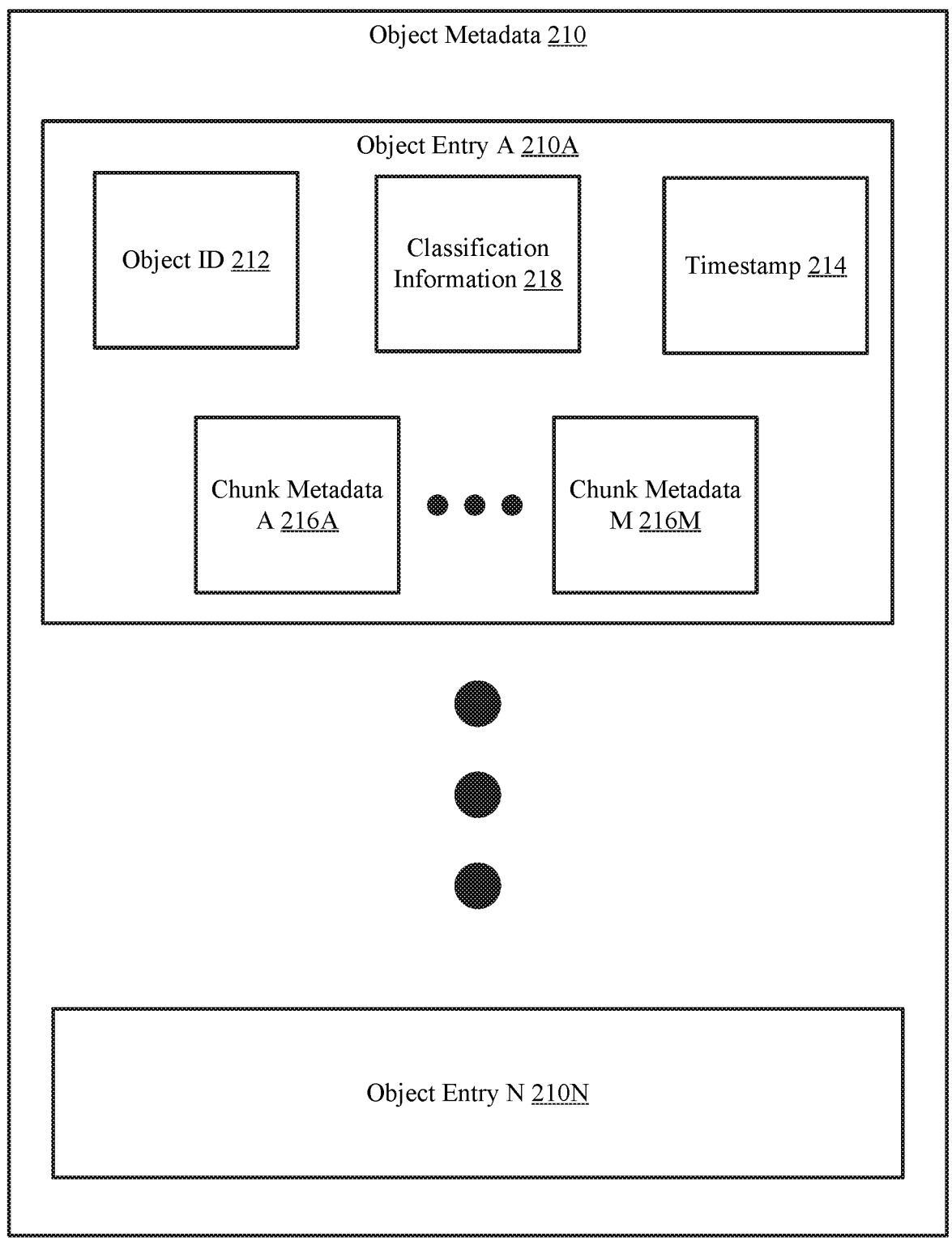
FIG. 2B shows a diagram of object metadata in accordance with one or more embodiments of the invention.

FIG. 2B shows a diagram of object metadata in accordance with one or more embodiments of the invention. The object metadata (210) may be an embodiment of the storage metadata (128, FIG. 1B; 166, FIG. 1E) discussed above. As discussed above, the object metadata (210) stores information about objects. The object metadata (210) may include one or more object entries (210A, 210N). Each metadata slice entry (200A, 200N) may include an object ID (212), classification information (218), chunk metadata (216A, 216M) and a timestamp (214). Each of the aforementioned portions of the object metadata (210) is discussed below.

In one or more embodiments of the invention, the object ID (212) is an identifier that specifies an object associated with the object entry (210A, 210N). The object ID (212) may be, for example, a string of numbers, letters, symbols, or any combination thereof that uniquely identifies the object.

In one or more embodiments of the invention, the classification information (218) specifies a classification ID associated with classification attributes of the object. The classification information (218) may be used to map the object entry (210A, 210N) to a classification mapping entry of a classification mapping. The classification mapping entry may specify one or more classification attributes associated with the object of the object entry (210A, 210N). The classification ID may be, for example, a string of numbers, letters, symbols, or any combination thereof that uniquely identifies the classification mapping entry.

In one or more embodiments of the invention, the timestamp (214) specifies a point in time that corresponds to a state of the object as specified by a set of chunk metadata. The timestamp (214) may be used to replay the object to a point in time. In one or more embodiments of the invention, the object is replayed to a point in time when the data associated with the object that was part of the object at the point in time is reconstructed to generate the object at the point in time. Said another way, the content of each object may vary over time and each time the object is modified a corresponding object entry is created where the object entry specifies chunk metadata for the chunks that make up the object at that point in time.

For example, at a first point in time, the object may include a first set of data, of which there is a first chunk and a second chunk. At a second point in time, the object may include a second set of data, of which there is a first chunk and a third chunk. The third chunk may be a modified version of the second chunk. The object may be replayed to the first point in time by obtaining the first chunk and the second chunk. The object may be replayed to the second point in time by obtaining the first chunk and the third chunk. For each point in time, there may be an object entry that specifies the object, the point in time, and each chunk used to replay the object.

In one or more embodiments of the invention, the chunk metadata (216A, 216M) each corresponds to a data chunk or parity chunk associated with the object at the point in time specified by the timestamp (214). The chunk metadata may include information about the data chunk or parity chunk such as, for example, a unique identifier (e.g., a fingerprint). The unique identifier may be, for example, a string of numbers, letters, symbols, or any combination thereof that uniquely identifies the chunk.

In one or more embodiments of the invention, an object entry (210A) is associated with more than one timestamp (214). In such embodiments, each chunk metadata (216A, 216M) may specify multiple chunks associated with a point in time. For example, after every iteration of an object (i.e., an object is associated with a new point in time), an object entry (210A, 210N) is updated with new chunk metadata (216A, 216M) that specifies the chunks of that iteration. In this manner, each object is associated with one object entry (210A, 210N) and each chunk metadata (202, 204) is associated with multiple chunks of an object at a point in time.

The object metadata (210) may be organized using other schemes without departing from the invention.

Figure 2C:
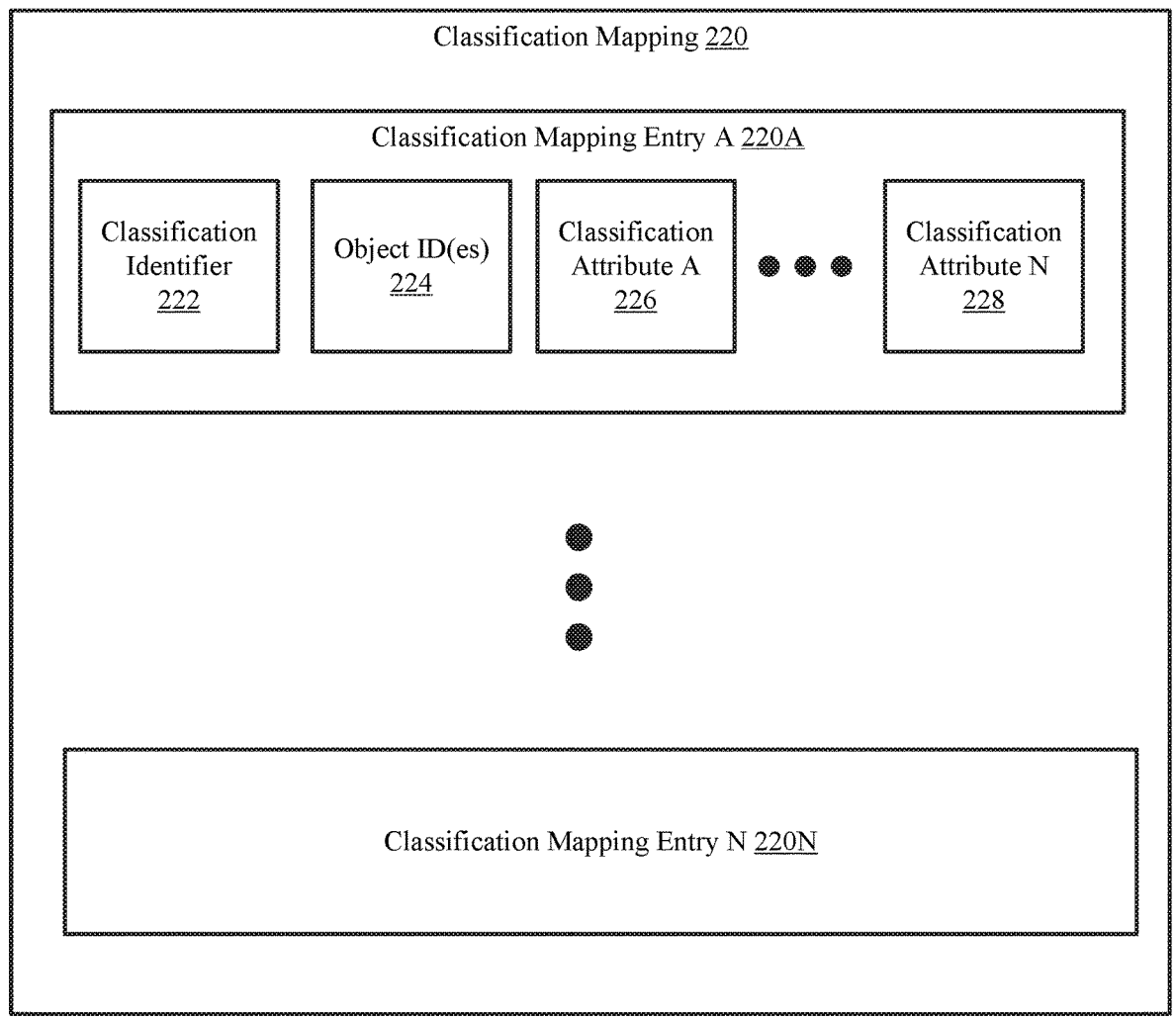
FIG. 2C shows a diagram of a classification mapping in accordance with one or more embodiments of the invention.

FIG. 2C shows a diagram of a classification mapping in accordance with one or more embodiments of the invention. The classification mapping (220) may be an embodiment of the classification mapping (129A, FIG. 1B) discussed above. As discussed above, the classification mapping (220) stores data classification information (also referred to as classification information) about objects specified in the object metadata (e.g., 210, FIG. 2B). The classification mapping (220) may include one or more classification mapping entries (220A, 220N). Each classification mapping entry (220A, 220N) may include a classification ID (222), one or more object IDs (224), and one or more classification attributes (226, 228). Each of the aforementioned portions of the storage metadata (200) is discussed below.

In one or more embodiments of the invention, the classification ID (222) is a data structure that uniquely identifies the classification mapping entry (220A, 220N). The classification ID (222) may be, for example, a string of numbers, letters, symbols, or any combination thereof that uniquely identifies the classification mapping entry.

In one or more embodiments of the invention, the object ID(s) is a data structure that specifies one or more objects. Each of the object IDs may be, for example, a string of numbers, letters, symbols, or any combination thereof that uniquely identifies the object.

In one or more embodiments of the invention, each classification mapping entry (220A, 220N) is associated with one object. In such a scenario, the classification mapping entry would include one object ID (224). Further to this embodiment, if a second object shared a classification ID (222) and the classification attributes (226, 228) to a first object, the classification mapping (220) would include two classification mapping entries, one associated with the first object and a second associated with the second object.

In one or more embodiments of the invention, each classification mapping entry (220A, 220N) is associated with one or more objects. In such a scenario, the classification mapping entry may include more than one object ID (224). For example, further to this embodiment, a classification mapping entry specifies a first classification ID and a first object ID associated with a first object. A classification mapping engine may update the classification mapping to specify a second object with the same classification ID as the first object. The classification mapping may be updated by updating the classification mapping entry to specify a second object ID associated with the second object.

In one or more embodiments of the invention, the classification mapping entry (220A, 220N) further includes classification attributes (226, 228). In one or more embodiments of the invention, a classification attribute (226, 228) is an attribute that further describes the nature of the objects of the classification mapping entry (220A). Non-limiting examples of classification attributes may include a geographical location in which the data associated with the objects was obtained, a legal entity that has ownership and/or access to the data, a retention period in which to store the data, one or more regulations with which the data is to be in compliance, and/or industry (e.g., healthcare, financial services, etc.).

In one or more embodiments of the invention, a legal entity is a person, a group of people, a partnership, corporation, any other business entity, or any combination thereof. The legal entity may be specified using, for example, an identifier that uniquely species the legal entity.

In one or more embodiments of the invention, a regulation is a set of legal standards set in place for the geographical location associated with the data in which the legal entity is to comply. For example, the state of California has a California Consumer Privacy Act (CCPA), which is a law that specifies a set of legal standards intended to protect the privacy of data owned or accessed by residents of the state of California. Legal entities accessing data that is associated with a classification mapping entry that specifies the CCPA will need to comply with the legal standards of the CCPA.

FIG. 3A shows a flowchart for storing data in a data cluster in accordance with one or more embodiments of the invention. The method shown in FIG. 3A may be performed by, for example, a data processor (122, FIG. 1B). Other components of the system illustrated in FIG. 1B may perform the method of FIG. 3A without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

In step 300, a write request is obtained from a host. The write request may specify an object, e.g., a file segment, a collection of files, or any other type of data without departing from the invention.

In step 302, a determination is made about whether an object entry associated with the object (i.e., the object specified with write request) is in the object metadata. In one or more embodiments of the invention, the data processor analyzes the object metadata to determine if any object entry includes an object ID that corresponds to the object specified in the write request. Further, the data processor analyzes a corresponding object entry (if any) that is associated with the object specified in the write request to determine whether the object entry includes a classification ID. If an object entry is stored in object metadata associated with the data in the write request (and the object entry includes a classification ID), the method proceeds to step 310; otherwise, the method proceeds to step 306.

In step 306, a classification attributes update is initiated. In one or more embodiments of the invention, the classification attributes update is a process for obtaining classification attributes associated with the data and storing the attributes in a classification mapping. In one or more embodiments of the invention, the classifications attributes update is initiated by prompting a data classification engine of the accelerator pool for additional details regarding the classification attributes associated with the object (i.e., the object specified in Step 300), see, e.g., FIG. 3B. The result of step 306 is to obtain one or more classification attributes for the object.

In step 308, the object metadata is updated based on the classification attributes update. In one or more embodiments of the invention, the result of step 306 is an updated classification mapping. The update may include generating a classification mapping entry. The classification mapping entry may include a classification ID. The object metadata may be updated by updating the object entry associated with the data by specifying the classification ID generated in step 306 or by creating an object entry corresponding the object, where the newly created object entry includes the aforementioned classification ID.

In step 310, an erasure coding procedure is performed on the data to generate data chunks and parity chunks. In one or more embodiments of the invention, the erasure coding procedure includes dividing the obtained data into portions, referred to as data chunks. Each data chunk may include any number of data segments associated with the obtained data. The individual data chunks may then be combined (or otherwise grouped) into slices (also referred to as Redundant Array of Independent Disks (RAID) slices). One or more parity values are then calculated for each of the aforementioned slices. The number of parity values may vary based on the erasure coding algorithm that is being used as part of the erasure coding procedure. Non-limiting examples of erasure coding algorithms are RAID-3, RAID-4, RAID-5, and RAID-6. Other erasing coding algorithms may be used without departing from the invention. Continuing with the above discussion, if the erasing code procedure is implementing RAID-3, then a single parity value is calculated. The resulting parity value is then stored in a parity chunk. If erasure coding procedure algorithm requires multiple parity values to be calculated, then the multiple parity values are calculated with each parity value being stored in a separate data chunk.

As discussed above, the data chunks are used to generate parity chunks in accordance with the erasure coding procedure. More specifically, the parity chunks may be generated by applying a predetermined function (e.g., P Parity function, Q Parity Function), operation, or calculation to at least one of the data chunks. Depending on the erasure coding procedure used, the parity chunks may include, but are not limited to, P parity values and/or Q parity values.

In one embodiment of the invention, the P parity value is a Reed-Solomon syndrome and, as such, the P Parity function may correspond to any function that can generate a Reed-Solomon syndrome. In one embodiment of the invention, the P parity function is an XOR function.

In one embodiment of the invention, the Q parity value is a Reed-Solomon syndrome and, as such, the Q Parity function may correspond to any function that can generate a Reed-Solomon syndrome. In one embodiment of the invention, a Q parity value is a Reed-Solomon code. In one embodiment of the invention, $Q = g_0 \cdot D_0 + g_1 \cdot D_1 + g_2 \cdot D_2 + \ldots + g_{n-1} \cdot D_{n-1}$, where Q corresponds to the Q parity, g is a generator of the field, and the value of D corresponds to the data in the data chunks.

In one or more embodiments of the invention, the number of data chunks and parity chunks generated is determined by the erasure coding procedure, which may be specified by the host, by the data cluster, and/or by another entity.

In one embodiment of the invention, each of the chunks generated in step 310 are associated with the classification ID.

In step 312, deduplication operation is performed on the data chunks to obtain deduplicated data chunks. In one or more embodiments of the invention, the deduplication operation is performed in the accelerator pool by identifying the data chunks of the obtained data and assigning a fingerprint to each data chunk. A fingerprint is a unique identifier that may be stored in metadata of the data chunk. The data processor performing the deduplication may generate a fingerprint for a data chunk and identify whether the fingerprint matches an existing fingerprint stored in storage metadata stored in the accelerator pool. If the fingerprint matches an existing fingerprint, the data chunk may be deleted, as it is already stored in the data cluster. If the fingerprint does not match any existing fingerprints, the data chunk may be stored as a deduplicated data chunk. Additionally, the fingerprint of each deduplicated data chunk is stored in a storage metadata slice entry of the storage metadata. A fingerprint (or other unique identifier) of each parity chunk is also generated and stored in the storage metadata slice entry.

In one or more embodiments of the invention, the deduplicated data chunks collectively make up the deduplicated data. In one or more embodiments of the invention, the deduplicated data chunks are the data chunks that were not deleted during deduplication.

In step 314, a storage metadata entry and the object metadata are updated based on the deduplicated data chunks. In one or more embodiments of the invention, the storage metadata is updated by generating a storage metadata slice entry that specifies the deduplicated data chunks and the parity chunks and their respective storage locations. In one or more embodiments of the invention, the object metadata is updated by updating an object entry associated with the object to specify the data chunks (which are not deduplicated) and the parity chunks.

In step 316, the deduplicated data chunks and parity chunk(s) are stored across data nodes in different fault domains in a non-accelerator pool. As discussed above, the deduplicated data chunks and the parity chunk(s) are stored in a manner that minimizes reads and writes from the non-accelerator pool. In one embodiment of the invention, this minimization is achieved by storing data chunks and parity chunks, which are collective referred to as a slice (or slice), in the same manner as a prior version of the slice. The data processor may use, as appropriate, storage metadata for the previously stored data chunks and parity chunks to determine where to store the data chunks and parity chunks in step 306.

More specifically, in one embodiment of the invention, if the deduplicated data chunks and parity chunks are the first version of a slice (as opposed to a modification to an existing/previously stored slice), then the deduplicated data chunks and parity chunks may be stored across the data nodes (each in a different fault domain) in the non-accelerator pool. The location in which the data chunk or parity chunk is stored is tracked using the storage metadata. The scenario does not require the data processor to use location information for previously stored data chunks and parity chunks.

However, if the deduplicated data chunks and parity chunks are the second version of a slice (e.g., a modification to a previously stored slice), then the deduplicated data chunks and parity chunks are stored across the nodes (each in a different fault domain) in the non-accelerator pool using prior stored location information. The information about the location in which the data chunk or parity chunk for the second version of the slice is stored in the storage metadata.

For example, consider a scenario in which the first version of the slice includes three data chunks (D1, D2, D3) and one parity chunk (P1) that were stored as follows: Data Node 1 stores D1, Data Node 2 stores D2, Data Node 3 stores D3, and Data Node 4 stores P1. Further, in this example, a second version of the slice is received that includes three data chunks (D1, D2', D3) and one newly calculated parity chunk (P1'). After deduplication only D2' and P1' need to be stored. Based on the prior storage locations (also referred to as locations) of the data chunks (D1, D2, and D3) and parity chunks (P1) for the first version of the slice, D2' is stored on Node 2 and P1' is stored on Node 4. By storing the D2' on Node 2 and P1' on Node 4 the data chunks and parity chunks associated with the second slice satisfy the condition that all data chunks and parity chunks for the second version of the slice are being stored in separate fault domains. If the location information was not taken into account, then the entire slice (i.e., D1, D2', D3, and P1') would need to be stored in order to guarantee that the requirement that all data chunks and parity chunks for the second version of the slice are being stored in separate fault domains is satisfied.

In one or more embodiments of the invention, if the data node that obtains the deduplicated data chunk, which is a modified version of a prior stored deduplicated data chunk, then the data node may: (i) store the modified version of the deduplicated data chunk (i.e., the data node would include two versions of the data chunk) or (ii) store the modified version of the deduplicated data chunk and delete the prior version of the deduplicated data chunk.

In one embodiment of the invention, the data processor includes functionality to determine whether a given data chunk is a modified version of a previously stored data chunk. Said another way, after the data is received from a host divided into data chunks and grouped into slices, the data processor includes functionality to determine whether a slice is a modified version of a prior stored slice. The data processor may use the fingerprints of the data chunks within the slice to determine whether the slice is a modified version of a prior stored slice. Other methods for determining whether a data chunk is a modified version of a prior stored data chunk and/or whether a slice is a modified version of a prior slice without departing from the invention.

In step 318, a distribution of storage metadata and object metadata is initiated. In one or more embodiments of the invention, the storage metadata and the object metadata are distributed by generating a copy of the storage metadata that includes the storage metadata slice entry generated in step 304 and a copy of object metadata which includes the object entry and sending the copy of storage metadata and the copy of object metadata in the non-accelerator pool.

In one or more embodiments of the invention, the copy of storage metadata, and the copy of object metadata are sent to a data node of a fault domain by the data processor. The data processor may further instruct the data node to distribute the copy of storage metadata and the copy of object metadata to other data nodes in the fault domain or to other data nodes in other fault domains. In this manner, a copy of the storage metadata is stored in multiple fault domains in the event of a storage metadata failure.

In one or more embodiments of the invention, the copy of storage metadata, and the copy of object metadata are sent to multiple fault domains by the data processor. The data processor may send a copy of storage metadata to one or more data nodes of each of the multiple fault domains. In this manner, a copy of the storage metadata is stored in multiple fault domains in the event of a storage metadata failure.

Though not shown in FIG. 3A, in one or more embodiments of the invention, the classification mapping may be distributed and ultimately stored across the data nodes in the same manner (or substantially the same manner) as the storage metadata and the object metadata.

While FIG. 3A describes erasure coding and deduplicating the data, embodiments of the invention may be implemented where the data is only erasure coded and not deduplicated. In such embodiments, step 314 includes generating a storage metadata slice using non-deduplicated data chunks and parity chunks and step 318 includes distributing non-deduplicated data chunks and parity chunks.

FIG. 3B shows a flowchart for initiating a classification attributes update in a data cluster in accordance with one or more embodiments of the invention. The method shown in FIG. 3B may be performed by, for example, a data classification engine (129, FIG. 1B). Other components of the system illustrated in FIG. 1B may perform the method of FIG. 3B without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

In step 320, a classification attributes request is sent to the host. The classification attributes request may request that the host to provide one or more classification attributes associated with the object (i.e., the object that was sent in the write request in step 300). The classification attributes request may specify, for example, that a geographical location associated with the data be specified, a legal entity that owns the data to be specified, one or more regulations that is to be complied when accessing the data, etc. The classification attributes request may specify other types of classification attributes without departing from the invention.

In step 322, a classification attributes response is obtained from the host based on the classification attributes request. In one or more embodiments of the invention, the classification attributes response may specify one or more classification attributes associated with the data as requested in the classification attributes request.

In one or more embodiments of the invention, the classification attributes response includes a classification ID. The classification ID may be associated with a classification mapping entry.

In step 324, a classification mapping is updated based on the attributes. In one or more embodiments of the invention, the classification mapping is updated by generating a classification mapping entry that specifies a classification ID and the object ID corresponding to the object in specified in the write request in step 300. The classification mapping entry may further specify the classification attributes obtained in the classification attributes response.

In one or more embodiments of the invention, if the classification attributes response includes classification attributes that match classification attributes of an existing classification mapping entry, then the object ID is added to an existing classification mapping entry. In this manner, the classification mapping entry may be associated with multiple distinct objects.

In one or more embodiments of the invention, after the classification mapping is updated, the data classification engine may provide a classification ID associated with the object to the data processor to be used for updating object metadata based on the classification attributes update.

FIG. 3C shows a flowchart for initiating a classification attributes update in a data cluster in accordance with one or more embodiments of the invention. The method shown in FIG. 3C may be performed by, for example, a data classification engine (129, FIG. 1B). Other components of the system illustrated in FIG. 1B may perform the method of FIG. 3C without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

In step 340, a determination is made about whether classification attributes associated with the object need to be changed. If classification attributes associated with the object need to be changed, the method proceeds to step 342; otherwise, the method returns to step 340. In one embodiment of the invention, the determination in step 340 may be made based on one or more of the following scenarios: (a) a change in the law requires objects that were previously associated with a certain regulation in a geographic region to be updated to be associated with a new regulation in the geographic region; (b) a change in company policy of a company that owns an object requires a retention policy of four years for all of its objects. Other scenarios may trigger a change in classification attributes without departing from the invention.

In step 342, the classification mapping is updated. In one or more embodiments of the invention, the classification mapping is updated by analyzing the classification mapping to identify one or more classification mapping entries associated with the object ID. The classification mapping entry may be modified to reflect the changes to the classification attributes. A classification mapping entry may be modified by adding, removing, and/or changing a classification attribute of the classification mapping entry. For example, if a new regulation is established that requires the object to comply with a new set of standards, the classification mapping entry may be updated to specify the new regulation and to remove the prior regulation.

In one or more embodiments of the invention, if a classification mapping entry specifies multiple objects, and only one object is to be changed based on the determination of step 340, the classification mapping may be updated so that the object ID of the affected object is associated with a new classification mapping entry that specifies the new classification attributes of the affected object. The new classification mapping entry may include a new classification ID. Further, the object ID is removed from the classification mapping entry that specified the multiple objects.

In step 344, one or more object entries impacted by the update to the classification mapping are updated. In one or more embodiments of the invention, if the affected object is associated with a new classification mapping entry, the object entries are updated by updating the classification IDs of the object entries with the new classification ID. Further, though not shown in FIG. 3C, the storage metadata may also be updated to associate a new classification ID with each of the data chunks that are associated with the aforementioned object(s) (i.e., the object(s) associated with the updated object entry(ies)).

Example

Figure 4A:
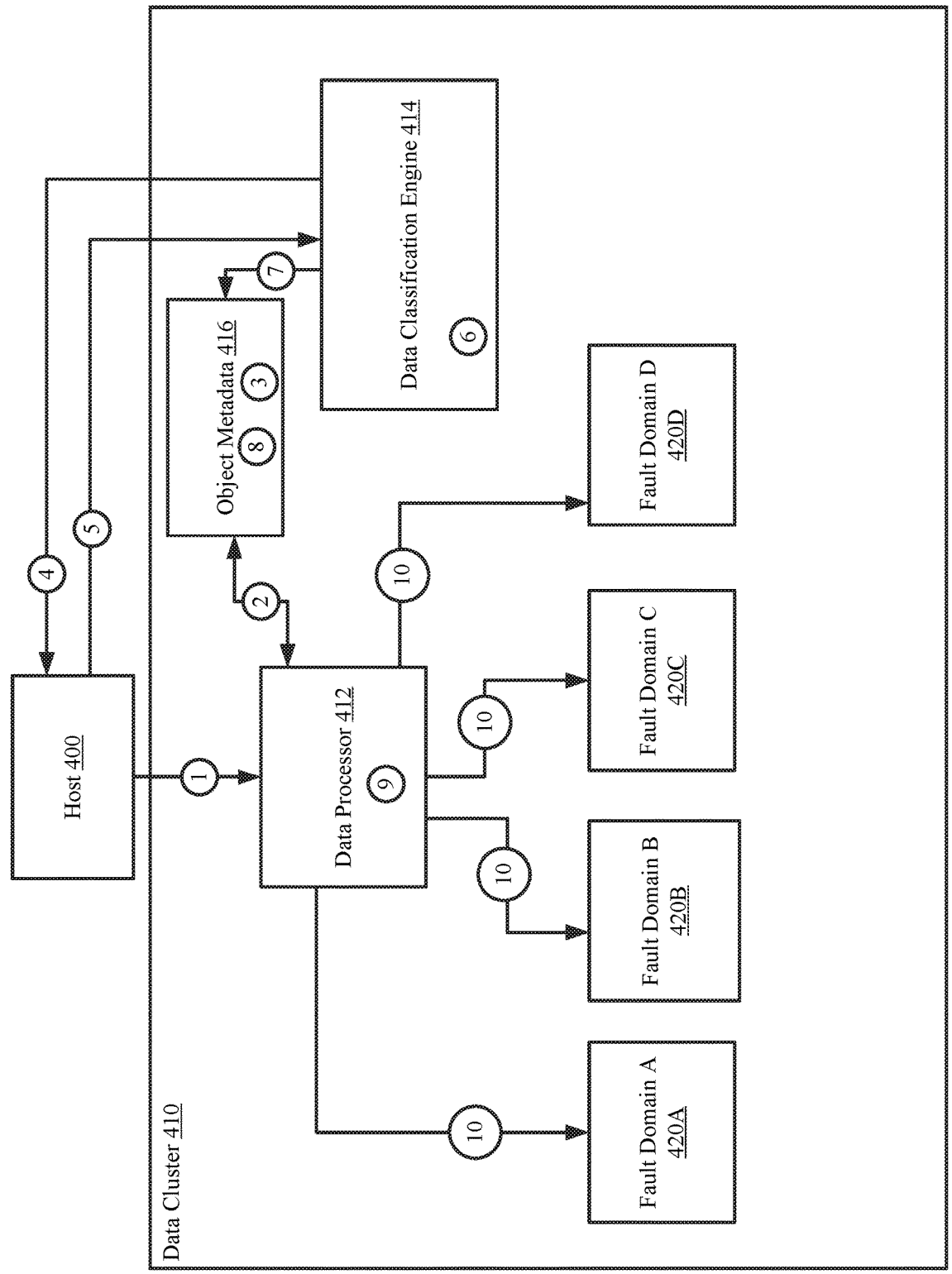
FIGS. 4A-4B show an example in accordance with one or more embodiments of the invention.
Figure 4B:
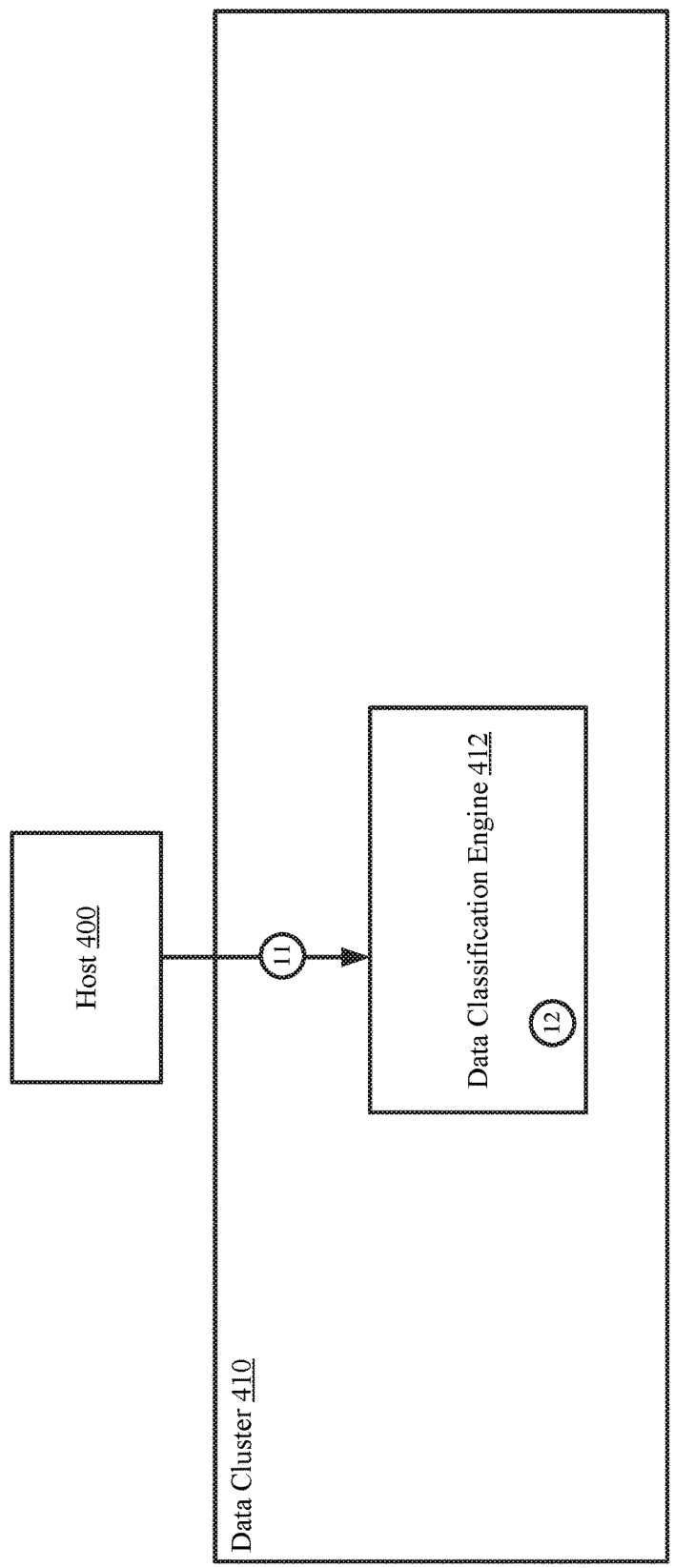

The following section describes an example. The example is not intended to limit the invention. The example is illustrated in FIGS. 4A-4B. Turning to the example, consider a scenario in which a data cluster obtains an object from a host. The host requests that the object be stored in the data cluster using a 3:1 erasure coding procedure. FIG. 4A shows a diagram a system in accordance with one or more embodiments of the invention. The host (400) sends the request, which specifies the object, to a data processor (412) of an accelerator pool (410) [1].

The data processor (412) uses object metadata (416) to determine if an object entry is associated with the object [2]. After determining that no object entry in the object metadata (416) is associated with the object, the data processor generates an object entry with an object ID associated with the object [3]. The data processor (412) further prompts a data classification engine (414) to perform a classification attributes update for classification attributes associated with the object.

The data classification engine (414), in response to the prompting, sends a classification attributes request to a host (400) to obtain one or more classification attributes associated with the object [4]. The data classification engine (414) subsequently obtains classification attributes in response from the host (400) [5]. The classification attributes specify that the object was generated in Europe ("EU"), specifically in the United Kingdom ("UK"), and it is to be stored, accessed, and/or used in compliance with a General Data Protection Regulation ("GDPR").

The data classification engine (416) uses the obtained classification attributes to generate a classification mapping entry for a classification mapping (not shown) stored in the data classification engine (414) [6]. The classification mapping entry may specify a classification ID, the object ID associated with the object, and the obtained classification attributes "EU," "UK," and "GDPR".

After the classification mapping is updated and a classification ID is generated, the data classification engine (414) sends the classification ID to the object metadata [7]. The classification ID is subsequently stored in the object entry associated with the object [8].

The data processor (412) performs the method of FIG. 3A to store the obtained object. Specifically, the data processor performs an erasure coding procedure on the object [9]. In this example, assume that the erasure coding procedure includes implementing RAID-3. The result of the erasure coding procedure is a group of three data chunks and a parity chunk.

The data chunks and the parity chunk are stored in the non-accelerator pool [10]. Specifically, each of the three data chunk and the parity chunk is stored in a unique fault domain. In other words, a first data chunk is stored in fault domain A (420A), a second data chunk is stored in fault domain B (420B), a third data chunk is stored in fault domain C (420C), and the parity chunk is stored in fault domain D (420D).

In addition to storing the data chunks and the parity chunks, the data processor generates a storage metadata slice entry in storage metadata (not shown) and an object entry in object metadata (416). A unique identifier of each deduplicated data chunk and parity chunk are stored in the storage metadata slice entry and in the object entry.

FIG. 4B shows a diagram of the system at a later point in time. in this example, the host obtains information that specifies a new regulation with which the object is to be in compliance. The new regulation may be a Data Protection Act ("DPA"). The host (400) sends a request to the data classification engine (412) to update the classification mapping in response to this change [11]. The data classification engine (412) determines that the request impacts a classification mapping entry because it includes the object ID corresponding to the impacted object. The data classification engine (412) updates the classification mapping entry associated with the object. The classification mapping entry is updated by adding the classification attribute "DPA" to the classification mapping entry [12]. In this manner, while the classification attributes have been updated for the object, because the classification ID did not change, the object metadata does not need to be updated.

End of Example

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention improve the efficiency of storing data that is in compliance with one or more regulations. Embodiments of the invention improve efficiency by storing a classification mapping that specifies the data, a geolocation associated with the data, and the regulations that are to be followed by the entities storing the data. The classification mapping may be updated to keep up with changes to real-world regulations that specify a set of standards for using, accessing, and/or storing data. Embodiments of the invention provide a data cluster with a way to effectively track data to ensure it is in compliance with the set of standards.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing data, the method comprising:
obtaining, by a data classification engine executing on an accelerator pool, the data from a host, wherein the data is associated with an object identifier (ID) and an object, wherein the accelerator pool comprises a first plurality of data nodes;
initiating a classification attributes update to obtain a classification mapping entry,
wherein the classification mapping entry is associated with a classification ID,
wherein a classification mapping comprises the classification mapping entry,
wherein the classification mapping entry of comprises the object ID, the classification ID, and a plurality of classification attributes, and
wherein the plurality of classification attributes comprises at least one of: a retention period for the data and a regulation associated with the data,
wherein the regulation comprises a set of legal standards applied to a legal entity, and
wherein the legal entity owns the data;
applying an erasure coding procedure to the data to obtain a plurality of data chunks and at least one parity chunk;
deduplicating the plurality of data chunks using a unique fingerprint generated for each of the plurality of data chunks to obtain a plurality of deduplicated data chunks;
generating storage metadata associated with the plurality of deduplicated data chunks and the at least one parity chunk;
generating an object entry associated with the plurality of data chunks, and the at least one parity chunk, wherein the object entry comprises the object ID and the classification ID;
storing the storage metadata and the object entry in the accelerator pool; and
storing, across a plurality of fault domains of a non-accelerator pool, the plurality of deduplicated data chunks and the at least one parity chunk,
wherein the non-accelerator pool comprises a second plurality of data nodes, and
wherein the first plurality of data nodes has a higher performance relative to the second plurality of data nodes.

2. The method of claim 1, further comprising:
making a determination that the classification mapping needs to be changed; and
in response to the determination:
  updating the classification mapping to obtain an updated classification mapping; and
  updating the object entry based on the update to the classification mapping.

3. The method of claim 2, wherein initiating the classification attributes update comprises:
obtaining the plurality of classification attributes; and
storing the plurality of classification attributes in the classification mapping.

4. The method of claim 3, wherein the classification mapping is stored in the data classification engine.

5. The method of claim 1, further comprising:
initiating metadata distribution of the storage metadata and the object entry across the plurality of fault domains.

6. A non-transitory computer readable medium comprising computer readable program code, which when executed by a computer processor enables the computer processor to perform a method for managing data, the method comprising:
obtaining the data from a host, wherein the data is associated with an object identifier (ID) and an object;
initiating a classification attributes update to obtain a classification mapping entry,
  wherein the classification mapping entry is associated with a classification ID,
  wherein a classification mapping comprises the classification mapping entry,
  wherein the classification mapping entry of comprises the object ID, the classification ID, and a plurality of classification attributes, and
  wherein the plurality of classification attributes comprises at least one of: a retention period for the data and a regulation associated with the data,
    wherein the regulation comprises a set of legal standards applied to a legal entity, and
    wherein the legal entity owns the data;
applying an erasure coding procedure to the data to obtain a plurality of data chunks and at least one parity chunk;
deduplicating the plurality of data chunks using a unique fingerprint generated for each of the plurality of data chunks to obtain a plurality of deduplicated data chunks;
generating storage metadata associated with the plurality of deduplicated data chunks and the at least one parity chunk;
generating an object entry associated with the plurality of data chunks, and the at least one parity chunk, wherein the object entry comprises the object ID and the classification ID;
storing the storage metadata and the object entry in the accelerator pool, wherein the accelerator pool comprises a first plurality of data nodes; and
storing, across a plurality of fault domains of a non-accelerator pool, the plurality of deduplicated data chunks and the at least one parity chunk,
wherein the non-accelerator pool comprises a second plurality of data nodes, and
wherein the first plurality of data nodes has a higher performance relative to the second plurality of data nodes.

7. The non-transitory computer readable medium of claim 6, the method further comprising:
making a determination that the classification mapping needs to be changed; and
in response to the determination:
  updating the classification mapping to obtain an updated classification mapping; and
  updating the object entry based on the update to the classification mapping.

8. The non-transitory computer readable medium of claim 7, wherein initiating the classification attributes update comprises:
obtaining the plurality of classification attributes; and
storing the plurality of classification attributes in the classification mapping.

9. The non-transitory computer readable medium of claim 8, wherein the classification mapping is stored in a data classification engine of the accelerator pool.

10. The non-transitory computer readable medium of claim 6, the method further comprising:
initiating metadata distribution of the storage metadata and the object entry across the plurality of fault domains.

11. A data cluster, comprising:
a host; and
an accelerator pool comprising a plurality of data nodes,
wherein a data node of the plurality of data nodes comprises a processor and memory comprising instructions, which when executed by the processor perform a method, the method comprising:
  obtaining data from the host, wherein the data is associated with an object identifier (ID) and an object;
  initiating a classification attributes update to obtain a classification mapping entry,
    wherein the classification mapping entry is associated with a classification ID,
    wherein a classification mapping comprises the classification mapping entry,
    wherein the classification mapping entry of comprises the object ID, the classification ID, and a plurality of classification attributes, and
    wherein the plurality of classification attributes comprises at least one of: a retention period for the data and a regulation associated with the data,
      wherein the regulation comprises a set of legal standards applied to a legal entity, and
      wherein the legal entity owns the data;
  applying an erasure coding procedure to the data to obtain a plurality of data chunks and at least one parity chunk;
  deduplicating the plurality of data chunks using a unique fingerprint generated for each of the plurality of data chunks to obtain a plurality of deduplicated data chunks;
  generating storage metadata associated with the plurality of deduplicated data chunks and the at least one parity chunk;
  generating an object entry associated with the plurality of data chunks, and the at least one parity chunk, wherein the object entry comprises the object ID and the classification ID;
  storing the storage metadata and the object entry in the accelerator pool; and
  storing, across a plurality of fault domains of a non-accelerator pool, the plurality of deduplicated data chunks and the at least one parity chunk,
  wherein the non-accelerator pool comprises a second plurality of data nodes, and wherein the plurality of data nodes has a higher performance relative to the second plurality of data nodes.

12. The data cluster of claim 11, the method further comprising:
    making a determination that the classification mapping needs to be changed; and
    in response to the determination:
        updating the classification mapping to obtain an updated classification mapping; and
        updating the object entry based on the update to the classification mapping.

13. The data cluster of claim 12, wherein initiating the classification attributes update comprises:
    obtaining the plurality of classification attributes; and
    storing the plurality of classification attributes in the classification mapping.

14. The data cluster of claim 13, wherein the classification mapping is stored in a data classification engine of the accelerator pool.

15. The data cluster of claim 11, the method further comprising:
    initiating metadata distribution of the storage metadata and the object entry across the plurality of fault domains.

* * * * *